US011963025B2

(12) United States Patent
Sadiq et al.

(10) Patent No.: US 11,963,025 B2
(45) **Date of Patent: *Apr. 16, 2024**

(54) BEAM RECOVERY PROCEDURE USING A SECOND COMPONENT CARRIER

(71) Applicant: QUALCOMM Incorporated, San Diego, CA (US)

(72) Inventors: Bilal Sadiq, Southlake, TX (US); Linhai He, San Diego, CA (US); Muhammad Nazmul Islam, Littleton, MA (US); Sundar Subramanian, San Diego, CA (US); Tianyang Bai, Somerville, NJ (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/990,346

(22) Filed: Nov. 18, 2022

(65) Prior Publication Data

US 2023/0083212 A1 Mar. 16, 2023

Related U.S. Application Data

(63) Continuation of application No. 16/248,523, filed on Jan. 15, 2019, now Pat. No. 11,540,150.

(Continued)

(51) Int. Cl.
*H04W 88/06* (2009.01)
*H04B 7/04* (2017.01)

(Continued)

(52) U.S. Cl.
CPC .............. *H04W 24/04* (2013.01); *H04B 7/04* (2013.01); *H04B 7/0695* (2013.01); *H04L 5/00* (2013.01);

(Continued)

(58) Field of Classification Search
CPC ........... H04L 5/0023; H04L 1/00; H04B 7/04; H04B 7/0626; H04B 7/0695;

(Continued)

(56) References Cited

U.S. PATENT DOCUMENTS 8,554,225 B2 10/2013 Kwon et al.
8,891,348 B2 11/2014 Yang et al.

(Continued)

FOREIGN PATENT DOCUMENTS

CN 107534466 A 1/2018

OTHER PUBLICATIONS

Huawei, et al., "Beam Measurement and Reporting", 3GPP Draft, 3GPP TSG RAN WG1 Meeting NR#3, R1-1715467, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017 (Sep. 17, 2017), XP051338935, 9 Pages, Sections 1, 3.1, 4.4.

(Continued)

*Primary Examiner* — Edan Orgad
*Assistant Examiner* — Vanneilian Lalchinthang
(74) *Attorney, Agent, or Firm* — Arent Fox, LLP

(57) ABSTRACT

Systems, methods, and apparatuses for performing a beam recovery procedure using a second CC are disclosed. A UE may perform a beam recovery procedure using two component carriers (CCs): for example, first component carrier may be a beam formed millimeter wave (MMW) carrier having a beam recovery procedure and second component carrier may be an assisting carrier such as a sub-6 GHz carrier or a different MMW carrier. In a first example, a UE may trigger beam recovery for first component carrier (on second component carrier), generate a beam measurement report, and transmit the beam report on resources allocated (Continued)

for uplink transmission on second component carrier. In a second example, a new scheduling request (SR) may be defined on first component carrier for second component carrier beam recovery. In a third example, RACH resources or procedures on second component carrier may be used to perform the beam recovery for first component carrier.

20 Claims, 16 Drawing Sheets

Related U.S. Application Data

(60) Provisional application No. 62/619,541, filed on Jan. 19, 2018.

(51) Int. Cl.

| | |
|---|---|
| ***H04B 7/06*** | (2006.01) |
| ***H04L 5/00*** | (2006.01) |
| ***H04W 16/28*** | (2009.01) |
| ***H04W 24/04*** | (2009.01) |
| ***H04W 72/04*** | (2023.01) |
| ***H04W 76/19*** | (2018.01) |
| *H04B 17/318* | (2015.01) |
| *H04W 24/08* | (2009.01) |
| *H04W 74/0833* | (2024.01) |

(52) U.S. Cl.
CPC ........... *H04W 16/28* (2013.01); *H04B 17/318* (2015.01); *H04W 24/08* (2013.01); *H04W 74/0833* (2013.01)

(58) Field of Classification Search
CPC .. H04B 17/318; H04B 7/088; H04B 7/06966; H04B 17/17; H04W 88/06; H04W 72/23; H04W 72/046; H04W 72/0413; H04W 72/21; H04W 16/28; H04W 24/08; H04W 74/0833; H04W 76/19
USPC .......................................................... 370/252
See application file for complete search history.

(56) References Cited

U.S. PATENT DOCUMENTS

| | | | |
|---|---|---|---|
| 8,913,593 B2 | 12/2014 | Dinan | |
| 9,674,838 B2 | 6/2017 | Takeda et al. | |
| 10,892,811 B2 | 1/2021 | Sadiq et al. | |
| 11,540,150 B2 | 12/2022 | Sadiq et al. | |
| 2012/0213096 A1 | 8/2012 | Krishnamurthy et al. | |
| 2017/0207843 A1* | 7/2017 | Jung | H04W 74/006 |
| 2017/0207845 A1 | 7/2017 | Moon et al. | |
| 2018/0139030 A1* | 5/2018 | Kim | H04W 72/20 |
| 2018/0255578 A1* | 9/2018 | Kim | H04L 5/001 |
| 2018/0368124 A1* | 12/2018 | Liu | H04W 72/21 |
| 2019/0074886 A1* | 3/2019 | Yoon | H04B 7/0617 |
| 2019/0081688 A1 | 3/2019 | Deenoo et al. | |
| 2019/0082335 A1* | 3/2019 | Yu | H04B 7/0695 |
| 2019/0150187 A1* | 5/2019 | Park | H04L 5/0094 370/330 |
| 2019/0200249 A1* | 6/2019 | Yoon | H04L 5/0057 |
| 2019/0215048 A1* | 7/2019 | Cirik | H04W 74/0833 |
| 2019/0215888 A1* | 7/2019 | Cirik | H04W 72/0446 |
| 2020/0059397 A1* | 2/2020 | da Silva | H04B 7/0695 |
| 2020/0059398 A1 | 2/2020 | Pan et al. | |
| 2020/0275523 A1* | 8/2020 | Zhang | H04W 76/27 |
| 2020/0275524 A1* | 8/2020 | Wang | H04B 7/0695 |

OTHER PUBLICATIONS

Huawei., et al., "RLF for NR", 3GPP TSG-RAN WG2-NR Adhoc#2, R2-1706745, Qingdao, China, Jun. 27-29, 2017, 7 Pages.

Interdigital Communications: "RLM for NR", 3GPP Draft; 3GPP TSG RAN WG2 #97bis, R2-1702875 (R15 NR WI AI10233 RLM), 3rd Generation Partnership Project (3GPP), Mobile Competence Centre, 650, Route Des Lucioles, F-06921 Sophia-Antipolis Cedex, France, vol. RAN WG2, No. Spokane, USA, Apr. 3, 2017-Apr. 7, 2017, Apr. 3, 2017 (Apr. 3, 2017), XP051244855, pp. 1-4.

Interdigital et al., "Remaining Issues on Beam Management", 3GPP draft; 3GPP TSG RAN WG1 Meeting AH 1801, R1-1800734 Beam Management Final, 3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 13, 2018 (Jan. 13, 2018), XP051385049, 6 Pages, Sections 1, 2.1.1.

International Search Report and Written Opinion—PCT/US2019/013830—ISA/EPO—dated Apr. 11, 2019.

Nokia., et al., "Beam Recovery", 3GPP Draft, R1-1708905, 3GPP TSG RAN WG1#89, 3rd Generation Partnership Project (3GPP), Mobile Competence Centre, 650, Route Des Lucioles, F-06921 Sophia-Antipolis Cedex, France, vol. RAN WG1, No. Hangzhou, May 15, 2017-May 19, 2017 May 6, 2017, XP051262756, Retrieved from the Internet: URL: http://www.3gpp.org/ftp/tsg_ran/WG1_RL1/TSGR1_89/Docs/ [retrieved on May 6, 2017], 7 pages.

Qualcomm: "Beam Failure Recovery Procedure", 3GPP Draft, 3GPP TSG RAN WG2 #92b, R1-1804788_Bfrprocedure, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018 (Apr. 15, 2018), XP051427055, 10 Pages,10 Pages, paragraph [03.2], p. 2-p. 3, p. 5-p. 7, the whole document.

Qualcomm: "Beam Management Offline Summary", 3GPP Draft; R1-1711965, 3rd Generation Partnership Project (3GPP), Mobile Competence Centre; 650, Route Des Lucioles; F-06921 Sophia-Antipolis Cedex; France, vol. RAN WG1, No. Hangzhou, China ; May 15, 2017-May 19, 2015 Jul. 1, 2017, XP051306186, Retrieved from the Internet: URL: http://www.3gpp.org/ftp/tsg_ran/WG1_RL1/TSGR1_AH/NR_AH_1706/Docs/ [retrieved on Jul. 1, 2017], 11 pages.

Vivo: "On Beam Failure Recovery Procedure", 3GPP TSG RAN WG1 Meeting #90, R1-1712839_On Beam Failure Recovery, 3rd Generation Partnership Project (3GPP), Mobile Competence Centre; 650, Route Des Lucioles, F-06921 Sophia-Antipolis Cedex, France, vol. RAN WG1, No. Prague, P.R. Czech, Aug. 21, 2017-Aug. 25, 2017 Aug. 20, 2017, XP051315651, 5 pages.

Zte, et al., "Remaining Details on Beam Recovery", 3GPP Draft; 3GPP TSG RAN WG1 Meeting AH 1801, R1-1800111 Remaining Details on Beam Recovery, 3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 13, 2018 (Jan. 13, 2018), XP051384606, 7 Pages.

* cited by examiner

300

400

BEAM RECOVERY PROCEDURE USING A SECOND COMPONENT CARRIER

CROSS-REFERENCE TO RELATED APPLICATION(S)

This application is a Continuation of U.S. patent application Ser. No. 16/248,523, entitled "BEAM RECOVERY PROCEDURE USING A SECOND COMPONENT CARRIER" and filed Jan. 15, 2019, which claims benefit of U.S. Provisional Application Ser. No. 62/619,541, entitled "BEAM RECOVERY PROCEDURE USING A SECOND COMPONENT CARRIER" and filed Jan. 19, 2018, which are expressly incorporated by reference herein in their entirety.

BACKGROUND

Aspects of the present disclosure relate generally to wireless communication networks, and more particularly, to performing a beam recovery procedure for a first component carrier (CC) using a second component carrier.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

One such need relates to improvements in beam recovery operations. For example, a UE may use directional transmissions for wireless communications. However, in some cases, the beam direction of the directional transmission may change. In such instance, if the beam is not changed, the communication signal may be compromised or lost. Thus, improvements in beam recovery operations may be desired.

SUMMARY

Features of the present disclosure leverage the availability of multiple component carriers in different frequency bands for beam failure recovery (BFR). In some examples, the base station may configure synchronization signal block (SSB) or channel state information reference signal (CSI-RS) in one component carrier as a reference (e.g., spatial quasi co-location (QCL)) for physical downlink control channel (PDCCH) demodulation reference signal (DMRS) in a different component carrier. In other examples, the base station may configure synchronization signal block (SSB) or channel state information reference signal (CSI-RS) in one component carrier as a reference for candidate beam search for a different component carrier. For example, a user equipment (UE) and the base station may be configured to communicate over multiple component carriers (CCs): for example, first component carrier may be a beam formed millimeter wave (MMW) carrier having a beam recovery procedure and second component carrier may be an assisting carrier such as a sub-6 Ghz or another MMW carrier.

If the UE detects a condition for performing a beam recovery procedure on first component carrier, it may transmit a signal to a serving base station using second component carrier. For example, the UE may transmit a beam recovery scheduling request (BFRR) signal (alternatively referred to as beam recovery signal or a beam recovery scheduling request) using a scheduled uplink resource on second component carrier, scheduling request resource, PUCCH resource, or a random access channel (RACH) resource in order to perform beam recovery for first component carrier.

In one example, a method for wireless communications implemented by a user equipment (UE) is disclosed. The method may include establishing communication with a base station over a first component carrier using one or more beams, and receiving a reference signal on a second component carrier associated with the first component carrier. The method may further include determining a block error ratio (BLER) of a channel transmitted using the one or more beams on the first component carrier based on the reference signal received on the second component carrier. The method may further include determining whether the one or more beams in the first component is failing based on the BLER.

In another example, an apparatus for wireless communications is disclosed. The apparatus may include a processor and a memory storing instructions and in electronic communication with the processor. The processor may be configured to execute the instructions to establish communication with a base station over a first component carrier using one or more beams, and receive a reference signal on a second component carrier associated with the first component carrier. The processor may further be configured to execute the instructions to determine a block error ratio (BLER) of a channel transmitted using the one or more beams on the first component carrier based on the reference signal received on the second component carrier. The processor may further be configured to execute the instructions to determine whether the one or more beams in the first component is failing based on the BLER.

In another example, a computer readable medium storing instructions, executable by a processor, for wireless communications is disclosed. The computer readable medium may include instructions for establishing communication with a base station over a first component carrier using one or more beams, and receiving a reference signal on a second component carrier associated with the first component carrier. The computer readable medium may further include instructions for determining a block error ratio (BLER) of a channel transmitted using the one or more beams on the first component carrier based on the reference signal received on the second component carrier. The computer readable medium may further include instructions for determining whether the one or more beams in the first component is failing based on the BLER.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, where a dashed line may indicate an optional component, and in which.

DETAILED DESCRIPTION

Figure 1:
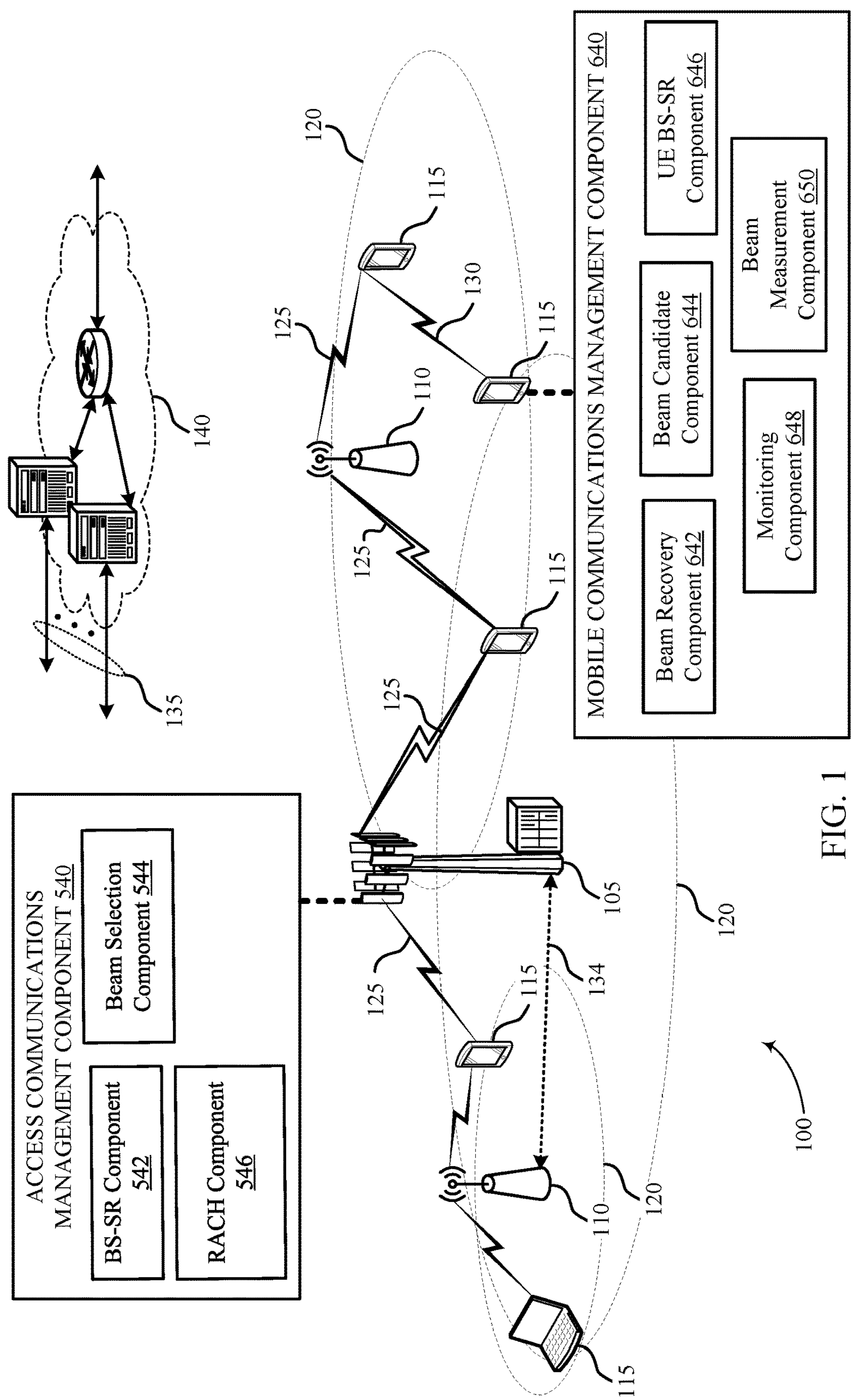
FIG. 1 shows a wireless communication network that supports performing a beam recovery procedure using a second component carrier (CC) in accordance with aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

Beamforming is a technique for directional signal transmission and reception that may be used, for example, for transmission in the millimeter wave (MMW) band. The use of beamforming may depend on factors such as the type of signal being transmitted and the channel conditions. If the beam direction is lost or degraded, a beam recovery procedure may be performed in which a user equipment (UE) sends a beam failure recovery request (BFRR) with a good reference beam. A base station receiving a beam on this resource infers the identity of the transmitted reference beam. Therefore, by detecting a BFRR signal, the base station may learn or determine that the UE is requesting a beam recovery, and may also learn or determine an identity of the good beam selected by the UE. However, if this BFRR signal is communicated in another carrier, e.g., a sub-6 GHz or another MMW carrier, this implicit beam identity information may not be communicated to the base station.

Aspects of the present disclosure solve the above-identified problem by implementing techniques to conduct a beam recovery for a first component carrier (e.g., a MMW carrier) using signals transmitted in second component carrier (e.g., a sub-6 GHz carrier or another MMW). The second component carrier (e.g., a sub-6 GHz carrier), in some examples, may assist the base station in acquiring measurement reports and implementing beam switch procedure for the first component carrier (e.g., a mmW carrier). In some examples, it should be appreciated that the second component carrier (e.g., assisting cell) may not necessarily have the same carrier frequency for downlink communication as for the uplink communications.

To facilitate beam recovery, the base station may configure SSB/CSI-RS in a second component carrier (e.g., MMW carrier) as a reference (e.g., spatial QCL) for PDCCH DMRS such that the UE may detect beam failure in the first component carrier by estimating the PDCCH block error ratio (BLER). Thus, where two carriers that are adjacent in frequency, the UE may be able to determine beam failure in one carrier using a shared SSB/CSI-RS reference in a different carrier. As such, based on SSB/CSI-RS received by the UE in a second component carrier, the UE may estimate PDCCH BLER and detect beam failure based on this estimate for all configured PDCCH beams. The BLER may be a ratio of a number of erroneous blocks received to the total number of blocks transmitted by the base station.

Additionally or alternatively, the SSBs/CSI-RSs transmitted in a second component carrier may also aid the UE in identifying new candidate beams in the first component carrier. For example, the UE may determine a beam strength, such as reference signal received power (RSRP), associated with one or more candidate beams in the first component carrier based on SSBs/CSI-RSs transmitted in a second component carrier. In some examples, multiple cells may be configured to use the same SSBs/CSI-Rs to find one or more candidate beams. This may lead to formation of BFR group that is a collection of multiple cells that may utilize shared SSBs/CSI-RSs. Thus, a beam failure for any of the multiple cells may also be estimated from the shared SSBs/CSI-RSs to the extent that the beams used for PDCCH are included in the SSB/CSI-RS beam sweep.

Thus, when UE detects a need for initiating beam recovery (e.g., by measuring reference beams in SS or CSI-RS beam sweep and determining that the current active beam signal quality has fallen below a threshold, or alternatively by detecting a separate candidate beam that has emerged that offers improved signal quality than the signal quality offered by the current active beam), the UE may trigger beam recovery on second component carrier by transmitting a BFRR signal to the base station. In some examples, the BFRR signal may be similar to a regular SR signal and CDMed (Code Division Multiplexed), FDMed (Frequency Division Multiplexed) or TDMed (Time Division Multiplexed) with regular SR or with PRACH. Additionally or alternatively, BFRR signal may be based on a different sequence than that of the regular SR or the PRACH. In these examples, BFRR may serve as a logical beam trigger signal (e.g., 1 bit) that signals to the base station that a beam recovery has been triggered by the UE. Aspects of the present disclosure provide multiple techniques that implement the above techniques. It should be appreciated by those of ordinary skill that any features of the specific techniques described below may be interchangeable and is not limited to the example, as described.

In one example, the UE may transmit a random access preamble on a configured cell within BFR group on a second component carrier to trigger beam recovery for the cell in the first component carrier. The UE may determine the "configured cell" from the configuration of the candidate SSBs/CSI-RS. For example, the "configured cell" may be one where SSBs/CSI-RSs are transmitted, or where the RACH associated with the SSBs is configured.

In other examples, the UE may trigger beam recovery for first component carrier on second component carrier by generating a beam measurement report and transmitting the beam measurement report on resources allocated for UL transmission on second component carrier. The beam measurement report may be generated by MAC layer and multiplexed with UL data on PUSCH of the second component carrier as a MAC-CE. However, if no PUSCH resources are allocated on second component carrier, the UE may trigger a regular SR on second component carrier on resources allocated for regular SR. In some cases, e.g., when UE is not UL synchronized, no PUSCH resources are allocated on second component carrier, and thus the UE may trigger a RACH procedure on second component carrier. In some aspects, the beam measurement report may comprises one or more beam identifications (IDs). The beam IDs may be identify one or more emerging candidate beams and an ID of a current active beam. Report may further comprise beam strength measurements for one or more of these beams, e.g., RSRP or CQI of the beams. In some examples, a MAC entity at the UE may have multiple mmW cells (instead of just one, namely, first component carrier in above example.) Many of these cells may detect beam failure and trigger a beam measurement report at the same time. In such instance, only one report may be transmitted by the UE. In some examples, the base station may configure cell groups for beam reporting (e.g., group cells based on beam-coherence). For example, the base station may configure a separate BFRR for each cell group. Additionally or alternative, the base station may configure one SR for multiple cell groups. In such instances, the base station and/or the UE may implement a "prohibit timer" that may be associated with the BFRR for each cell group. The "prohibit timer" may prevent a cell group from triggering multiple BFRRs in a short duration. The "prohibit timer" may also prevent superfluous MAC-CEs per cell group. Then UE may transmit one report per cell group and cancel all other reports from cells in the cell group.

In the instance where the UE is configured for both random access preamble based signaling and the SR/MAC-CE based cross-carrier transmissions, the UE may determine which BFRR transmission to employ based on one or more UE implementation or by prioritizing either the random access preamble or SR/MAC-CE based transmissions. Additionally or alternatively, if the configured second cell is not in beam failure, the UE may elect the SR/MAC-CE based cross-carrier signaling. However, if the configured second cell is in beam failure, the UE may select random access preamble based signaling of the beam failure on the first component carrier. Further, the UE may also elect to use SR/MAC-CE based transmissions only if the configured second cell is itself not in beam failure. If it is in beam failure, the UE may use random access preamble based signaling.

In yet another example, a new scheduling request may be defined on second component carrier for first component carrier beam recovery. For example, a BFRR on second component carrier may convey the 1-bit information that the UE has triggered beam recovery procedure for first component carrier. Upon transmitting the BFRR to the base station, the UE may monitor PDCCH on second component carrier for DCIs related to first component carrier. Specifically, in such instance, the UE may monitor second component carrier for DCIs triggering beam measurement reports for first component carrier. Moreover, the UE may monitor DCIs triggering CSI-RS on first component carrier and a beam measurement report based on this CSI-RS. In some examples, the UE may monitor PDCCH on second component carrier over a predetermined time window which may start after the transmission of BFRR on second component carrier. If the UE receives a DCI on second component carrier related to first component carrier, the time window may be extended by a predetermined amount. This extension may be computed from the time the UE received the DCI.

In this example, the base station, in response to receiving the new scheduling request (or logical beam trigger signal), may request the UE to provide a beam measurement report such that the base station may identify a candidate beam that provides improved signal quality. The base station may also identify from the report the identity of failed beam(s). In some aspects, the candidate beam may be one of a plurality of current active beams on which the UE may be communicating with the base station, or in the alternative the candidate beam may be another beam identified as offering improved signal quality in comparison to the plurality of currently active beams. The UE, upon receiving a trigger and resource for beam measurement report, may transmit a beam measurement report on the allocated resources. The allocated resources may be PUSCH resources or PUCCH resources. For example, for a short beam measurement report, e.g., comprising one measurement, the resources may be allocated on PUCCH or PUSCH, whereas for a long beam measurement report, e.g., comprising multiple measurements, the resources may be allocated on PUSCH. The beam measurement report may be transmitted on either first component carrier or second component carrier. The DCI in such instances may indicate which CC (e.g., first component carrier or second component carrier) the UE is requested to transmit the beam measurement report on). The DCI may also command the UE to switch a control beam on first component carrier to a beam included in the report. This beam may be one of the beam with best RSRP, the first beam in the report, or the beam with best RSRP that isn't already being used as active beam. The UE and the base station may apply the beam switch at a predetermined time, e.g., with a predetermined time gap after the transmission of the beam measurement report.

Upon transmitting the beam measurement report to the base station on second component carrier, the UE may switch PDCCH beam for first component carrier to the candidate beam identified in the beam measurement report. As indicated above, the candidate beam that the UE may switch to may provide improved signal quality than the currently active beam used for communication between the UE and base station. Additionally or alternatively to the UE completely switching the PDCCH beam to the candidate beam, the UE may switch the PDCCH beam for a first time period (e.g., subset of preconfigured PDCCH search spaces (i.e., OFDM symbols)) and switch back to the current PDCCH beam for the second time period. In such instance, PDCCH monitoring pattern may be implemented in an interleaved manner.

In a further alternative, instead of continuously switching the PDCCH beam to the candidate beam preemptively, the UE may also monitor second component carrier for a beam switch command for first component carrier PDCCH beam to be received from the base station on the second component carrier. Even further, the UE may monitor first component carrier on the current PDCCH beam in order to receive the beam switch command on the first component carrier before the UE switches the PDCCH beam to the candidate beam.

In accordance with the third example, a robust new beam recovery signal is disclosed for transmission on second component carrier for conducting beam recovery for first component carrier using the second component carrier. In such example, the BFRR may explicitly convey the beam ID of the candidate beam that was being implicitly conveyed in the BFRR transmitted on first component carrier. As such, the base station may identify the candidate beam that offers improved signal quality based on receiving the BFRR.

In accordance with the fourth example, features of the present disclosure may utilize existing RACH procedure on second component carrier for performing beam recovery on first component carrier. RACH procedure on second component carrier may be contention free random access (CFRA) or contention based random access (CBRA).

In the instance of CFRA, a preamble may be assigned to a UE on second component carrier for conveying beam recovery signal on first component carrier. Upon receiving the message of CFRA on second component carrier, the base station may identify the UE that wants to convey beam recovery or scheduling request on first component carrier. However, because the base station may not know the exact beam ID that the UE wants to convey to base station, the base station may request the UE to generate and transmit a beam recovery report. Alternatively, in another example, a set of preambles may be assigned to a UE on second component carrier for conveying beam recovery signal on first component carrier. Each preamble in the set may be mapped to a different beam on first component carrier. As such, upon receiving preamble of CFRA on second component carrier, the base station may uniquely identify the candidate beam to use for the UE.

In the instance of CBRA, the UE may convey, through a message, that the UE transmitted RACH to base station in order to request beam recovery on first component carrier. The message may convey a 1 bit signal that identifies UE's reason to transmit RACH. The message may also contemporaneously convey both the beam index of first component carrier that UE has detected before and plans to utilize to convey its beam recovery request. Upon receiving the message, the base station may either automatically switch the identified candidate beam or issue a beam switch command to the UE to switch the PDCCH beam to the candidate beam.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a wireless communication network 100 that supports performing a beam recovery procedure using a multiple component carriers (CCs) in accordance with aspects of the present disclosure. Wireless communication network 100 may include the following components: base station 105, access point (AP) 110, user equipment (UE) 115, coverage area 120, communication link 125, direct wireless link 130, backhaul link 135, and core network 140.

Base stations 105 may incorporate aspects of the base stations described with reference to FIGS. 3, 5, and 6. Base stations 105 may interface with the core network 140 through backhaul links 135 (e.g., S1, etc.). The base stations 105 may perform radio configuration and scheduling for communication with the UEs 115, or may operate under the control of a base station 105 controller (not shown). In various examples, the base stations 105 may communicate, either directly or indirectly (e.g., through core network), with one another over backhaul links 135 (e.g., X1, etc.), which may be wired or wireless communication links 125.

Base stations 105 may wirelessly communicate with the UEs 115 via one or more base station antennas. In some examples, base stations 105 may be referred to as a base transceiver station, a radio base station 105, an access point, an access node, a radio transceiver, a NodeB, evolved node B (eNB), gNB, Home NodeB, a Home eNodeB, a relay, or some other suitable terminology. The wireless communication network may include base stations 105 of different types (e.g., macro base stations or small cell base stations, described below). Additionally, the plurality of base stations 105 may operate according to different ones of a plurality of communication technologies (e.g., 5G (or new radio (NR)), fourth generation (4G)/Long Term Evolution (LTE), 3G, Wi-Fi, Bluetooth, etc.), and there may be overlapping geographic coverage areas 120 for different communication technologies.

Base stations 105 may include access communications management component 540, which may establish communication with a UE 115 over a first component carrier using one or more beams and communicate with the UE 115 as described below. In some examples, access communications management component 540 may include the following components: BS-SR component 542, beam selection component 544, and RACH component 546. In some cases, the first component carrier is a MMW carrier and the second component carrier is a sub-6 GHz carrier. These components may perform the functions described below with reference to FIG. 5.

A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For example, a UE 115 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network. Additionally, a UE 115 may be internet of things (IOT) or machine-to-machine (M2M) type of device, e.g., a low power, low data rate (relative to a wireless phone, for example) type of device, that may in some aspects communicate infrequently with wireless communication network or other UEs 115. A UE 115 may be able to communicate with various types of base stations 105 and network equipment including macro eNBs, small cell eNBs, macro gNBs, small cell gNBs, relay base stations 105, and the like.

UEs 115 may include mobile communications management component 640. Mobile communications management component 640 may communicate with a base station 105 over a first component carrier using one or more beams. In some examples, mobile communications management component 640 may include the following components: beam recovery component 642, beam candidate component 644, UE BS-SR component 646, monitoring component 648, and beam measurement component 650. These components may perform the functions described below with reference to FIG. 6.

Each of the base stations 105 may provide communication coverage for UEs 115 over a respective geographic coverage area 120. The geographic coverage area 120 for a base station 105 may be divided into sectors or cells making up only a portion of the coverage area 120 (not shown). The geographic coverage area 120 may represent a macro cell, a small cell, or other types of cell. The term "cell" is a 3GPP term that can be used to describe a base station 105, a carrier or component carrier associated with a base station 105, or a coverage area 120 (e.g., sector, etc.) of a carrier or base station 105, depending on context. A macro cell may generally cover a relatively large area (e.g., several kilometers in radius) and may allow unrestricted access by UEs 115 with service subscriptions with the network provider.

A small cell may include a relative lower transmit-powered base station 105, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small area and may allow unrestricted access by UEs 115 with service subscriptions with the network provider. A femto cell may also cover a small geographic area (e.g., a home) and may provide restricted access and/or unrestricted access by UEs 115 having an association with the femto cell (e.g., in the restricted access case, UEs 115 in a closed subscriber group (CSG) of the base station 105, which may include UEs 115 for users in the home, and the like). A base station 105 for a macro cell may be referred to as a macro eNB. A base station 105 for a small cell may be referred to as a small cell eNB, a pico eNB, a femto eNB, or a home eNB. A base station 105 may support one or multiple (e.g., two, three, four, and the like) cells (e.g., component carriers).

The core network 140 may include components for management mobile communications such as one or more mobility management entity (MME)s, serving gateways, packet gateways, or home subscriber service (HSS) components. In some cases, the core network 140 comprises an evolved packet core (EPC). The core network 140 may provide user authentication, access authorization, tracking, internet protocol (IP) connectivity, and other access, routing, or mobility functions.

In some examples, wireless communication network 100 may be or include one or any combination of communication technologies, including a NR or 5G technology, a Long Term Evolution LTE or LTE-Advanced (LTE-A) or MuLTEfire technology, a Wi-Fi technology, a Bluetooth technology, or any other long or short range wireless communication technology. In LTE/LTE-A/MuLTEfire networks, the term eNB may be generally used to describe the base stations 105, while the term 'UE' may be generally used to describe the UEs 115. The wireless communication network 100 may be a heterogeneous technology network in which different types of eNBs provide coverage for various geographical regions.

The communication networks that may accommodate some of the various disclosed examples may be packet-based networks that operate according to a layered protocol stack and data in the user plane may be based on the internet protocol (IP). A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network support of radio bearers for the user plane data.

At the physical (PHY) layer, the transport channels may be mapped to physical channels. In some aspects of the wireless communication network, base stations 105 or UEs 115 may include multiple antennas for employing antenna diversity schemes to improve communication quality and reliability between base stations 105 and UEs 115. Additionally or alternatively, base stations 105 or UEs 115 may employ multiple input, multiple output (MIMO) techniques that may take advantage of multi-path environments to transmit multiple spatial layers carrying the same or different coded data. Wireless communication network may support operation on multiple cells or carriers, a feature which may be referred to as carrier aggregation (CA) or multi-carrier operation. A carrier may also be referred to as a CC, a layer, a channel, etc. The terms "carrier," "component carrier," "cell," and "channel" may be used interchangeably herein.

A UE 115 may be configured with multiple downlink CCs and one or more uplink CCs for carrier aggregation. Carrier aggregation may be used with both frequency division duplexing (FDD) and time division duplexing (TDD) component carriers. The base stations 105 and UEs 115 may use spectrum up to Y MHz (e.g., Y=5, 10, 15, or 20 MHz) bandwidth per carrier allocated in a carrier aggregation of up to a total of Y*x MHz (x=number of component carriers) used for transmission in each direction. The carriers may or may not be adjacent to each other. Allocation of carriers may be asymmetric with respect to downlink (DL) and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

A beam recovery procedure may include a UE 115 sending a BFRR signal (alternatively called beam recovery signal or a scheduling request) on a resource associated (i.e. thru spatial quasi co-location (QCL) antenna port indication, with a good reference beam). The reference beam may be part of a synchronization signal (SS) or channel state information reference signal (CSI-RS) beam sweep that the UE 115 measures to initiate beam recovery or to determine a good emerging beam candidate. A base station 105 receiving one or more beams on this resource is associated (e.g., QCL) with the transmitted reference one or more beams. Therefore, by detecting a BFRR signal, the base station 105 may learn that the UE 115 is requesting a beam recovery as well as an identity of the good beam selected by the UE 115.

A UE 115 may be configured with two CCs: first component carrier may be a beamformed MMW carrier having a beam recovery procedure and second component carrier may be an assisting carrier such as a sub-6 GHz carrier or different MMW carrier. In some cases, a network may configure second component carrier as the assisting carrier for first component carrier, for example the network may configure second component carrier as a physical uplink control channel (PUCCH) cell for first component carrier. Additionally and alternatively, the network may configure SSB/CSI-RS in the second component carrier as a reference (e.g., spatial QCL) for PDCCH DMRS for beam failure detection. A UE 115 may detect conditions for initiating beam recovery, for example, by measuring reference beams in a SS or CSI-RS beam sweep. Specifically, the UE 115 may measure or estimate the BLER to identify possible beam failure. The conditions for initiating a beam recovery may also include detecting that the current beam (e.g., the physical downlink control channel (PDCCH) beam) has weakened or detecting that a candidate beam has emerged that is significantly better than a currently used beam. In some examples, the candidate beam in the first component carrier may also be identified using SSBs/CSI-RSs transmitted in the second component carrier. For example, the UE 115 may measure the RSRP of one or more candidate beams in the first component carrier based on the SSBs/CSI-RSs received in the second component carrier. This may trigger a beam recovery operation on second component carrier (since second component carrier has been configured by NW for beam recovery of first component carrier).

In a first example, a UE 115 may trigger beam recovery for first component carrier (on second component carrier), generate a beam measurement report, and transmit the beam report on resources allocated for uplink (UL) transmission on second component carrier. The beam measurement report may be generated by a media access control (MAC) layer and multiplexed with UL data on physical uplink shared channel (PUSCH) of the second component carrier. If no PUSCH resources are allocated on second component carrier, the UE 115 may trigger a scheduling request on second component carrier. The beam measurement report may include one or more beam identifications (IDs), including the beam IDs of emerging candidate beams and an ID of a current active beam. The report may further include beam strength measurements for one or more of these beams, e.g., received signal reference power (RSRP) or channel quality information (CQI) of the beams. A MAC entity at the UE 115 may have multiple MMW cells (i.e., instead of just first component carrier). In some cases, many of these cells may detect beam failure and trigger a beam measurement report at the same time. In this case, the UE 115 may send a single report. In some cases, a base station 105 may configure cell groups for beam reporting (e.g., group cells based on beam-coherence). Then UE 115 may transmit one report per cell group and cancel all other reports.

In a second example, a new scheduling request may be defined on first component carrier for second component carrier beam recovery. For example, a BFRR on second component carrier may convey the 1-bit information that the UE 115 has triggered beam recovery procedure for second component carrier. First, the UE 115 determines to trigger beam recovery for first component carrier on second component carrier, and transmits BFRR on second component carrier. In some cases, the expected base station 105 behavior upon detection of this BFRR from the UE 115 is to trigger an SS or CSI-RS measurement report for CC.

In a first alternative of the second example, the UE 115 monitors PDCCH on second component carrier for downlink control information (DCI)s related to first component carrier after sending a BFRR. In some cases, if second component carrier is not in the scheduling cell for first component carrier, the UE 115 may not monitor second component carrier DCIs triggering beam measurement reports for first component carrier. The UE 115 may monitor PDCCH on second component carrier over a preconfigured time window, starting after the transmission of BFRR on second component carrier. Specifically, UE 115 may monitor second component carrier for DCIs triggering beam measurement reports for first component carrier.

Upon receiving a trigger and resource for beam measurement report, UE 115 may transmit a beam measurement report. The beam measurement report may be transmitted on first component carrier or second component carrier. In some cases, DCI may indicate which CC to transmit the beam measurement report on. After transmitting the beam measurement report the UE 115 may either switch PDCCH to a beam included in the beam measurement report or monitor second component carrier for a beam switch command. If the UE 115 switches the PDCCH, the switch may happen at a preconfigured time after the transmission of the beam measurement report. Moreover, the UE 115 may switch PDCCH for a subset of preconfigured PDCCH search spaces (e.g., certain orthogonal frequency-division multiplexing (OFDM) symbols) but not switch for others. That is, the UE 115 may continue to use the current PDCCH beam on those other search spaces. PDCCH monitoring pattern may happen in an interleaved manner.

If the UE 115 has conveyed multiple beam IDs in the beam measurement report, it may use different RX beam to receive these different beams. In this case, the base station 105 can try different TX beams in different subsets of the monitoring period. For example, if a total monitoring period is 4T and the UE 115 reports 4 beams, the base station 105 will transmit through beam 1 during time 0 to time T, beam 2 during time T to 2T and so on. The UE 115 may select its RX beam accordingly. A base station 105 can convey this pattern a priori to the UE 115 or this interleaved pattern can be specified in the spec. If the UE 115 monitors second component carrier (i.e., DCI or MAC CE) for a beam switch command for first component carrier PDCCH beam, the monitoring may be limited to a preconfigured time window starting after the transmission of beam measurement report.

In a second alternative of the second example, the UE 115 continues monitoring first component carrier on the current beam and expects to receive a trigger and resource for beam measurement report for CC. That is, the UE 115 may follow a standard procedure after sending the BFRR on CC. In this alternative, second component carrier may not temporarily assume responsibility of beam recovery of CC. That is, if the BFRR contains no information regarding a new good beam the UE 115 has discovered, there base station 105 and the UE 115 may wait to perform a beam recovery until after a further information exchange.

In a third example, a new scheduling request on second component carrier may explicitly convey a missing beam id that was implicitly conveyed in the BFRR transmitted on first component carrier itself. In this example, the UE 115 may trigger beam recovery for first component carrier on second component carrier, and then transmits BFRR on second component carrier, where BFRR comprises an identity of a good beam selected by the UE 115. Similar alternatives as described in the second example may be applicable for the third example. That is, the UE 115 may switch PDCCH beam on first component carrier after sending BFRR (at least on a subset of search spaces) or second component carrier may explicitly trigger a beam switch for second component carrier to the beam indicated in the BFRR.

In a fourth example, an existing random access channel (RACH) procedure on second component carrier may be used for first component carrier beam recovery. The RACH based solution may be used in general, or in combination with the previous examples. For instance, a UE 115 may selects one of the previous examples if it is UL time synchronized in second component carrier and may select the RACH based beam recovery transmission on second component carrier if it is not UL time synchronized.

In some cases, a RACH procedure on second component carrier can be a contention free random access (CFRA) procedure. A preamble can be assigned to a UE 115 on second component carrier for conveying beam recovery signal on CC. Upon receiving Msg1 of CFRA on second component carrier, a base station 105 may identify the UE 115 that wants to convey beam recovery or scheduling request on first component carrier but may not know the beam ID that the UE 115 wants to convey. In this situation, the base station 105 response may be similar to that described in the second example. Alternatively, a set of preambles can be assigned to a UE 115 on second component carrier for conveying beam recovery signal on first component carrier. Each preamble in the set may be mapped to a different beam on first component carrier. Upon receiving preamble (Msg1) of CFRA on second component carrier, the base station 105 may uniquely identify the beam for the UE 115. In this situation, the base station 105 response may be similar to that described in the first example.

In other cases, a RACH procedure on second component carrier can be a contention based random access (CBRA). In this case, the UE 115 may convey through Msg3 that it transmitted RACH to request beam recovery on first component carrier. Msg3 may conveys 1 bit indicating a UE's reason to transmit RACH. In this situation, the base station 105 response may be similar to that described in the second example. A separate time-frequency region may be reserved for contention based PRACH on second component carrier to convey beam recovery signal on first component carrier. Upon receiving Msg1, the base station 105 may realize that this RACH on second component carrier was transmitted to convey beam recovery for first component carrier. After the completion of Msg3/Msg4 of this procedure, the base station 105 may realize which UE 115 conveyed this request. In any of the examples discussed above, the number of retransmissions in first component carrier used to convey beam recovery request on first component carrier may be limited to a maximum number.

The number of beam failure recovery request transmissions may be configurable by using parameters such as the number of transmissions, a timer, or a combination thereof. In case of unsuccessful recovery from beam failure, a UE 115 may sends an indication to higher layers, and refrain from further beam failure recovery. The same parameters may also be used to define maximum number of retransmissions on second component carrier to convey beam recovery request for first component carrier, after which UE 115 sends an indication to higher layers and refrains from further beam recovery. In some cases, the values for timer and number of retransmissions could be different between second component carrier and first component carrier. The numerology (tone spacing, symbol and slot duration, etc.) could also be different between second component carrier and first component carrier. In some cases, first component carrier may use an over-6 GHz frequency band and may use shorter symbol or slot duration, while second component carrier uses sub-6 GHz band and longer symbol or slot duration.

In some cases, a base station 105 may configure the same number of retransmissions on second component carrier as it would have done in first component carrier. Then the UE 115 may have to wait for a long time before it can refrain from further beam recovery. Hence, a base station 105 can configure different maximum retransmission limits for first component carrier and second component carrier if the UE 115 wants to convey beam recovery request for first component carrier. For example, a base station 105 can configure N1 retransmissions and N2 retransmissions on first component carrier and second component carrier, respectively, if UE 115 wants to convey beam recovery request for first component carrier. In other words, if a UE 115 conveys beam recovery request for first component carrier in second component carrier, it can retransmit it N2 times before sending an indication to upper layers. If UE 115 conveys beam recovery request for first component carrier in first component carrier, it can retransmit it N1 times before sending the indication. In many examples, N1 may be greater N2.

In another example, a base station 105 can configure a timer for the UE 115 to convey beam recovery request for first component carrier. It can be left up to UE 115 implementation to determine which CC (first component carrier or second component carrier) it uses to convey beam recovery request for first component carrier. In some cases, a maximum number of retransmissions will depend on UE's number of selections for first component carrier and second component carrier. The UEs 115 may be dispersed throughout the wireless communication network, and each UE 115 may be stationary or mobile.

Figure 2:
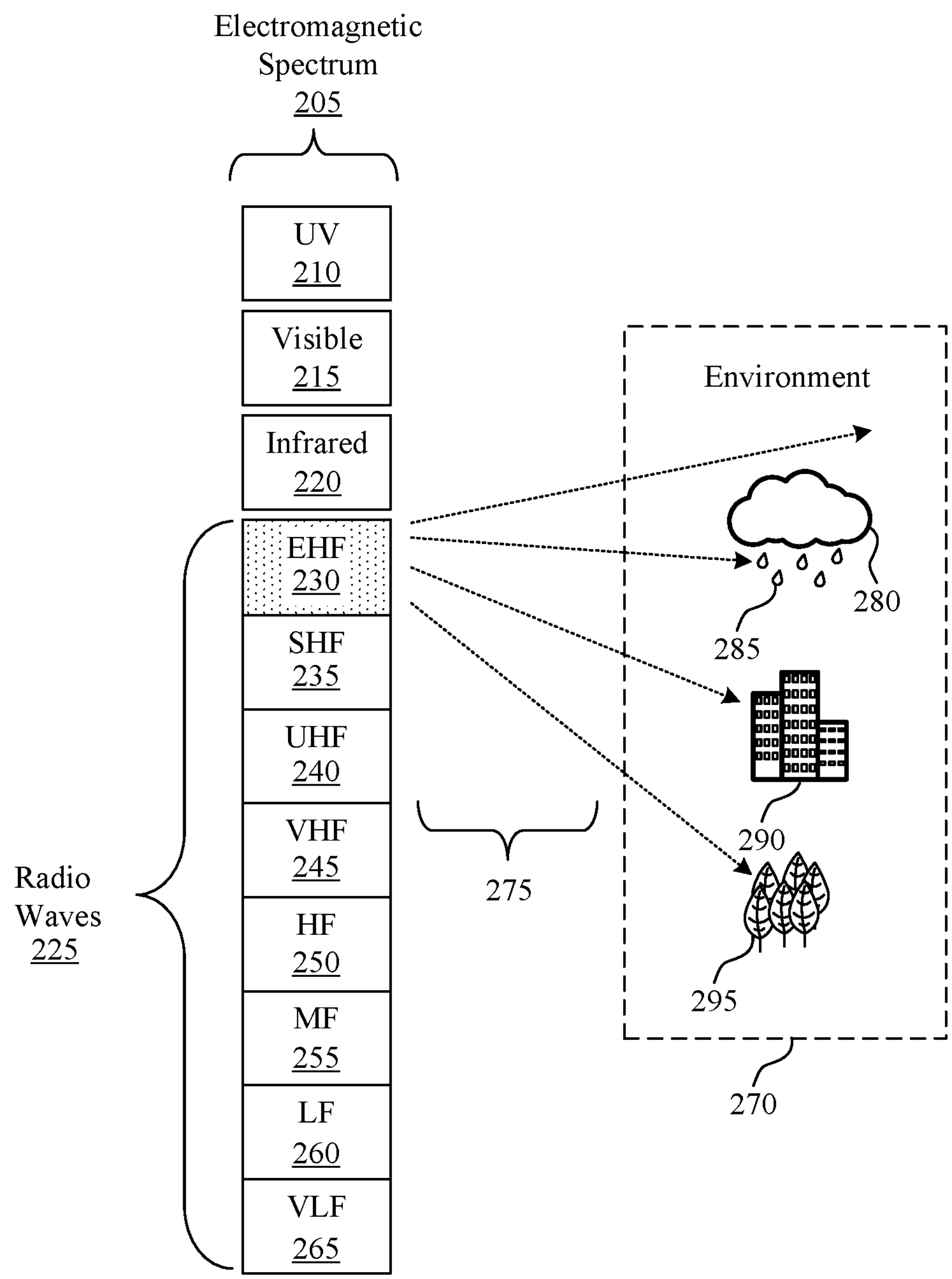
FIG. 2 shows a spectrum diagram that illustrates aspects of the frequency range in which some of the communications described herein are performed in accordance with aspects of the present disclosure.

FIG. 2 shows a spectrum diagram 200 that illustrates aspects of the frequency range in which some of the communications described herein are performed in accordance with aspects of the present disclosure. Spectrum diagram 200 may include the following components: electromagnetic spectrum 205 and environment 270.

In some examples, electromagnetic spectrum 205 may include the following components: ultra-violet (UV) radiation 210, visible light 215, infrared radiation 220, and radio waves 225. The MMW (or extremely high frequency (EHF)) portion of the electromagnetic spectrum corresponds to electromagnetic radiation with a frequency of 30-300 GHz and a wavelength between 1 mm and 1 cm. Near MMW may extend down to a frequency of 3 GHz with a wavelength of 100 millimeters.

In some examples, radio waves 225 may include the following components: EHF band 230, super high frequency (SHF) band 235, ultra high frequency (UHF) band 240, very high frequency (VHF) band 245, high frequency (HF) band 250, medium frequency (MF) band 255, low frequency (LF) band 260, and very low frequency (VLF) band 265. The EHF band 230 lies between the SHF band 235 and the far infrared band. The SHF band 235 may also be referred to as the centimeter wave band.

In some examples, environment 270 may include the following components: MMW radiation 275, atmosphere 280, rain 285, obstacle 290, and foliage 295. MMW radiation 275 may be subject to substantial absorption and scattering by atmospheric gases (especially oxygen), foliage 295, rain 285, and other environmental factors. In some cases, a wireless communications network may operate using MMW radiation 275. However, the range of MMW communications may be limited by relatively high path loss and, in some cases, short range. Thus, base stations in networks utilizing MMW transmissions may be more densely packed, or may use techniques such as beamforming to compensate. The short wavelength of MMW transmissions compared to lower frequency bands may enable beamforming in devices that have a relatively small antenna array.

Figure 3:
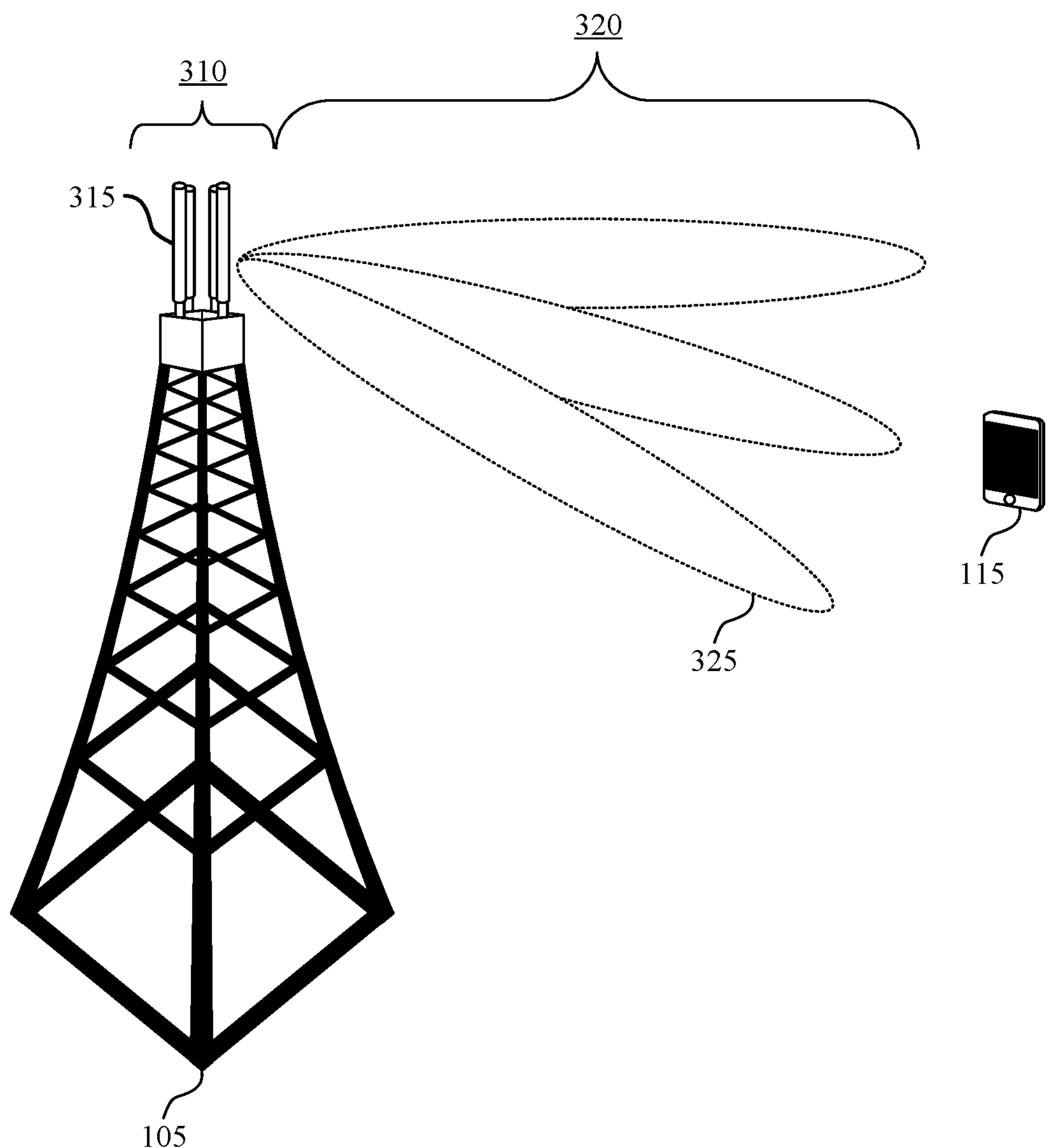
FIG. 3 shows a schematic diagram that supports performing a beam recovery procedure using a second CC in accordance with aspects of the present disclosure.

FIG. 3 shows a schematic diagram 300 that supports performing a beam recovery procedure using a second CC in accordance with aspects of the present disclosure. Specifically, schematic diagram 300 illustrates an example of beamforming operations, and may include the following components: base station 105, beamforming pattern 320, and UE 115.

Base station 105 may incorporate aspects of the base stations described with reference to FIGS. 1, 5 and 6. In some examples, base station 105 may include beamforming array 310. In some examples, beamforming array 310 may include one or more antennas 315. Beamforming is a technique for directional signal transmission and reception. Beamforming at a transmitter may involve phase-shifting the signal produced at different antennas 315 in an array to focus a transmission in a particular direction. The phase-shifted signals may interact to produce constructive interference in certain directions and destructive interference in other directions. By focusing the signal power, a transmitter may improve communication throughput while reducing interference with neighboring transmitters.

Similarly, beamforming at a receiver may involve phase-shifting a signal received at different antennas 315. When combining the phase shifted signals, the receiver may amplify a signal from certain directions and reduce the signal from other directions. In some cases, receivers and transmitters may utilize beamforming techniques independently of each other. In other cases, a transmitter and receiver may coordinate to select a beam 325 direction. The use of beamforming may depend on factors such as the type of signal being transmitted and the channel conditions. For example, directional transmissions may not be useful when transmitting to multiple receivers, or when the location of the receiver is unknown. Thus, beamforming may be appropriate for unicast transmissions, but may not be useful for broadcast transmissions. Also, beamforming may be appropriate when transmitting in a high frequency radio band, such as in the MMW band.

Since the beamforming array 310 size is proportional to the signal wavelength, smaller devices may be capable of beamforming in high frequency bands. Also, the increased receive power may compensate for the increased path loss at these frequencies. In some examples, beamforming pattern 320 may include one or more beams 325, which may be identified by individual beam IDs.

Figure 4:
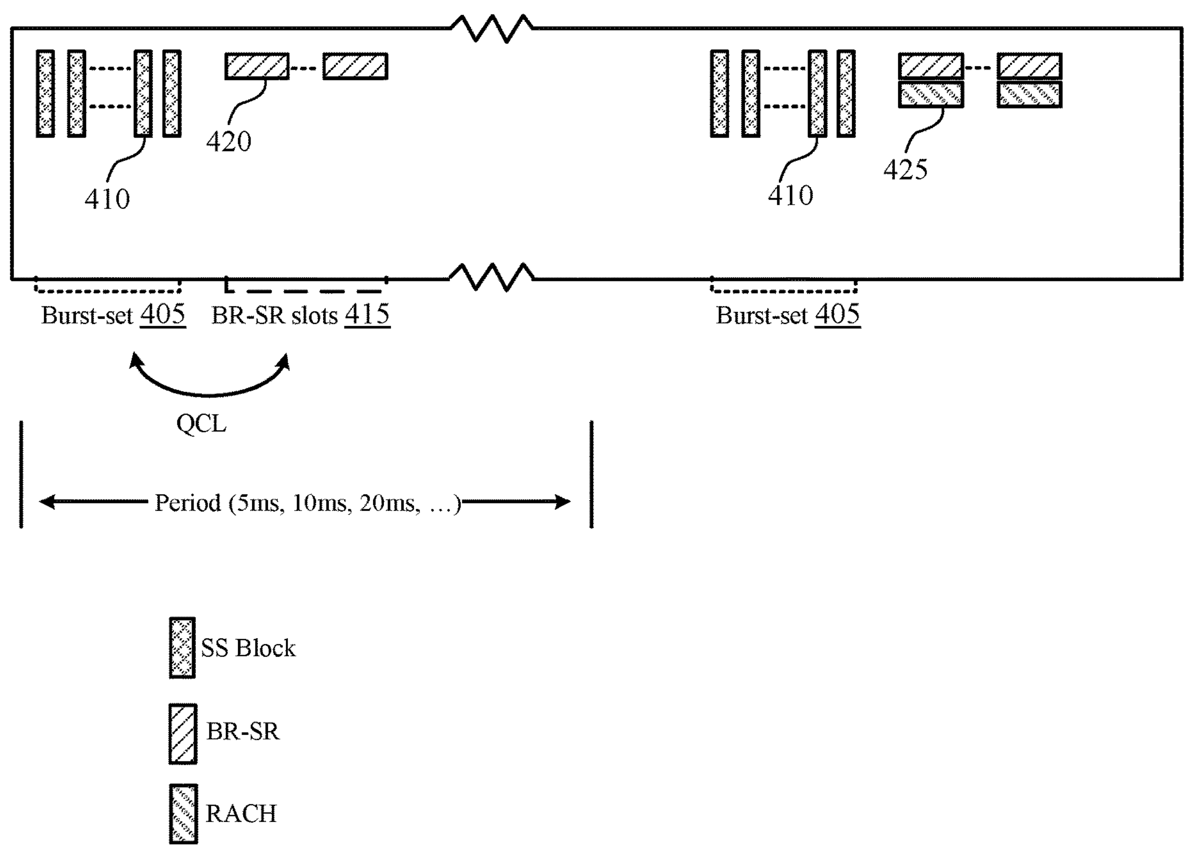
FIG. 4 shows a beam recovery configuration that supports performing a beam recovery procedure using a second CC in accordance with aspects of the present disclosure.

FIG. 4 shows a beam recovery configuration that supports performing a beam recovery procedure using a second CC in accordance with aspects of the present disclosure. Specifically, using synchronization signal (SS) and SR-RS resources QCL with the SS. Beam recovery configuration may include the following components: burst set 405 and BFRR slot 415. In some examples, burst set 405 may include one or more synchronization signal SS blocks 410. In some examples, BFRR slot 415 may include BFRR signal 420 and RACH signal 425. As described in the present disclosure, a beam recovery procedure for a first CC may utilize resources on a second CC associated with either BFRR signals 420, RACH signals 425, or both.

For example, the base station may configure SSB/CSI-RS in a second component carrier (e.g., a MMW carrier) as a reference (e.g., spatial QCL) for PDCCH DMRS such that the UE may detect beam failure in the first component carrier by estimating the PDCCH BLER. Thus, where two carriers that are adjacent in frequency, the UE may be able to determine beam failure in one carrier using a shared SSB/CSI-RS reference in a different carrier. As such, based on SSB/CSI-RS received by the UE in a second component carrier, the UE may estimate PDCCH BLER and detect beam failure based on this estimate for all configured PDCCH beams. The BLER may be a ratio of a number of erroneous blocks received to the total number of blocks transmitted by the base station.

Additionally or alternatively, the SSBs/CSI-RSs transmitted in a second component carrier may also aid the UE in identifying new candidate beams in the first component carrier. For example, the UE may determine the reference signal received power (RSRP) associated with one or more candidate beams in the first component carrier based on SSBs/CSI-RSs transmitted in a second component carrier. In some examples, multiple cells may be configured to use the same SSBs/CSI-Rs to find a candidate beams. This may lead to formation of BFR group that is a collection of multiple cells that may utilize shared SSBs/CSI-RS. Thus, a beam failure for any of the multiple cells may also be estimated from the shared SSBs/CSI-RSs to the extent that the beams used for PDCCH are included in the SSB/CSI-RS beam sweep.

Figure 5:
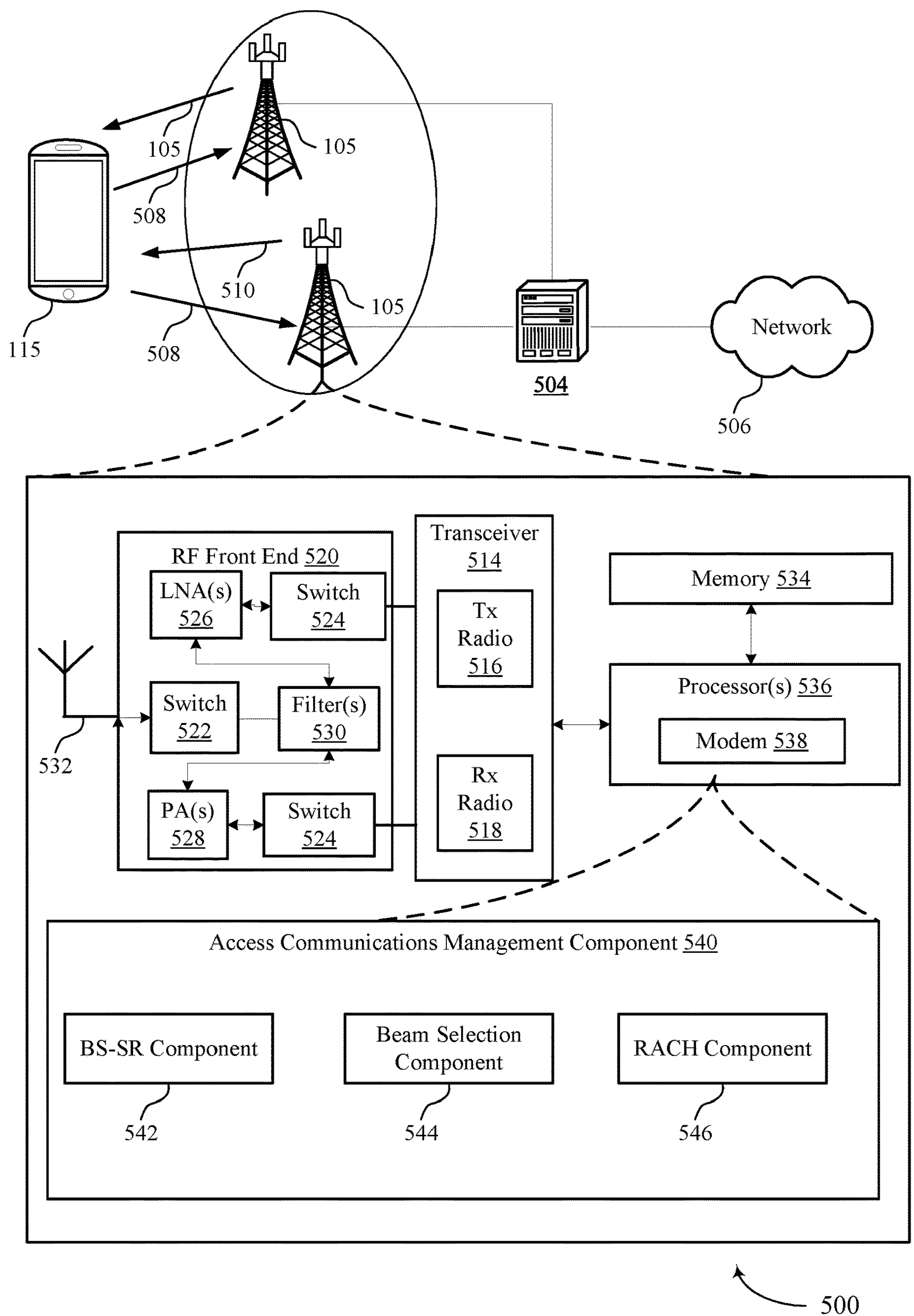
FIG. 5 is a schematic diagram of a base station that support performing a beam recovery procedure using a second CC in accordance with aspects of the present disclosure.

FIG. 5 shows a schematic diagram 500 that supports performing a beam recovery procedure using a second CC in accordance with aspects of the present disclosure. Schematic diagram 500 may include the following components: UE 115, gateway 504, network 506, uplink communications 508, downlink (DL) communications 510, and base station 512.

UE 115 may incorporate aspects of the UEs described with reference to FIGS. 1, 3, and 6. A gateway 504 may comprise a software and/or hardware firewall that may be used to selectively route information from an access network to a core network and beyond. Thus, a gateway 504 functions to block various external data transmissions from being sent to certain internal locations. In this regard, a gateway 504 may be restrictively configured to allow remotely situated users to access content such as web pages within a computer system or network 506 (e.g., via hypertext transfer protocol (HTTP) protocols) and to block all other access. A gateway 504 may also provide a port for outgoing Internet traffic. A gateway 504 may be further configured to internally route IP-Packets.

The network 506 may include a number of interconnected communications devices. For example, the network 506 may represent the internet or an operator specific communications system.

Base station 105 may incorporate aspects of the base stations described with reference to FIGS. 1, 3, and 6. In some examples, base station 105 may include the following components: transceiver 514, radio frequency (RF) front end 520, antenna array 532, memory 534, and processor 536.

Figure 6:
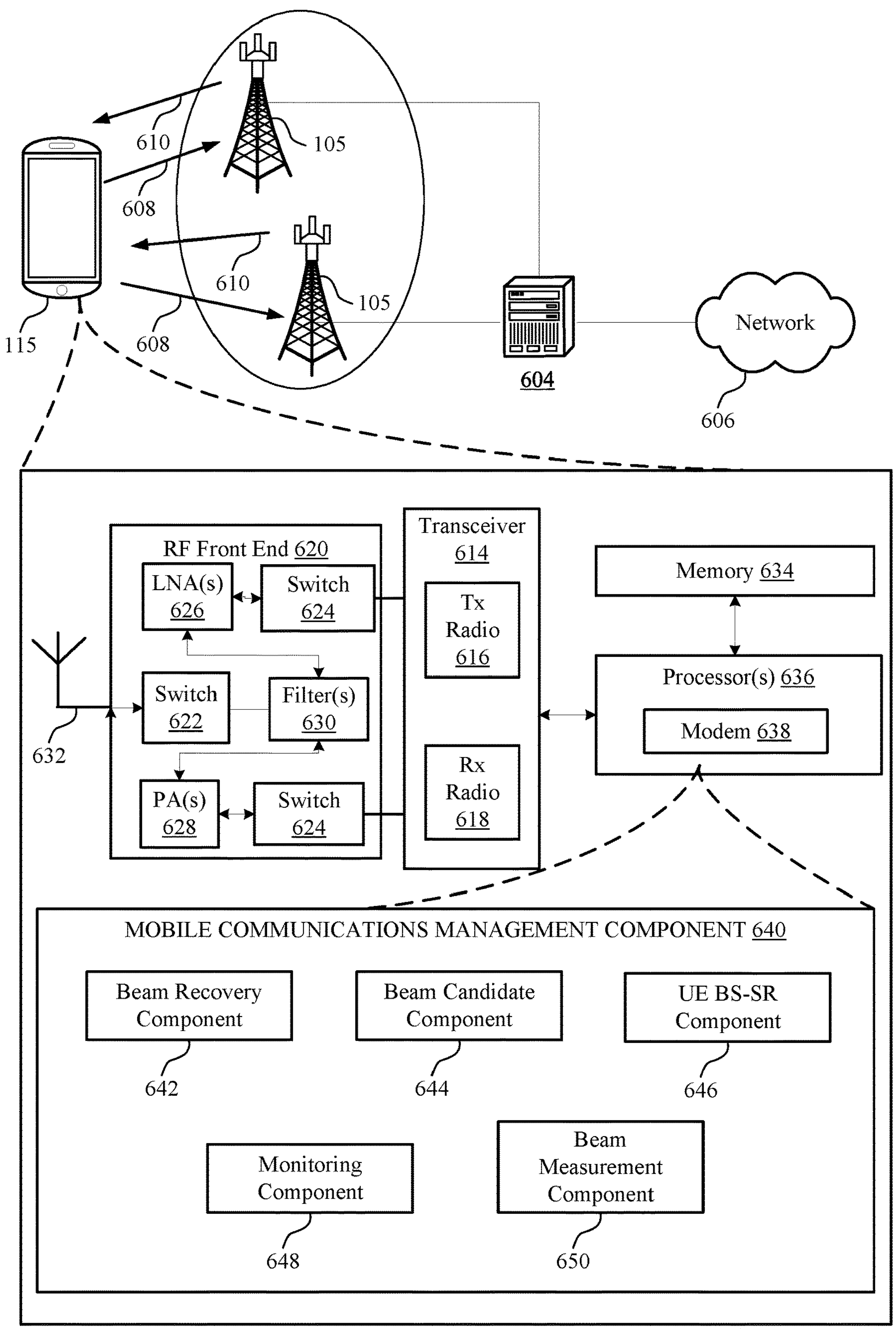
FIG. 6 is a schematic diagram of a UE that support performing a beam recovery procedure using a second CC in accordance with aspects of the present disclosure.

Transceiver 514 may incorporate aspects of the transceiver with reference to FIGS. 3 and 6. In some examples, transceiver 514 may include the following components: TX radio 516 and RX radio 518.

TX radio 516 may include hardware, firmware, and/or software code executable by a processor 536 for transmitting data, the code comprising instructions and being stored in a memory 534 (e.g., computer-readable medium). A suitable example of TX radio 516 may including, but is not limited to, an RF transmitter.

RX radio 518 may include hardware, firmware, and/or software code executable by a processor 536 for receiving data, the code comprising instructions and being stored in a memory 534 (e.g., computer-readable medium). RX radio 518 may be, for example, an RF receiver. In an aspect, receiver may receive signals transmitted by at least one base station. Additionally, an RX radio 518 may process such received signals, and also may obtain measurements of the signals including, but not limited to, signal-to-noise ratio (SNR), RSRP, received signal strength indicator (RSSI), etc.

In some examples, RF front end 520 may include the following components: input switch 522, radio switches 524, low noise amplifier (LNA) 526, power amplifier (PA) 528, and filter 530. RF front end 520 may operate in communication with one or more antennas and transceiver 514 for receiving and transmitting radio transmissions, for example, wireless communications between base station 105 and UE 115. RF front end 520 may operate in communication with one or more antennas and transceiver 514 for receiving and transmitting radio transmissions, for example, wireless communications between base station 105 and UE 115.

An input switch 522 may be used to select one or more antennas. Radio switches 524 may connect or disconnect one or more RX radios 518 or TX radios 516. In an aspect, RF front end 520 may also use one or more radio switches to select a particular LNA 526 or PA 528 and its specified gain value based on a desired gain value for a particular application.

LNA 526 may amplify a received signal at a desired output level. In an aspect, each LNA 526 may have a specified minimum and maximum gain values. One or more PAs 528 may be used by RF front end 520 to amplify a signal for an RF output at a desired output power level. In an aspect, each PA 528 may have specified minimum and maximum gain values.

Filter 530 may selectively suppress aspects of a signal. For example, one or more filters 530 can be used by RF front end 520 to filter 530 a received signal to obtain an input RF signal. Similarly, in an aspect, for example, a respective filter 530 can be used to filter 530 an output from a respective PA 528 to produce an output signal for transmission. In an aspect, each filter 530 can be connected to a specific LNA 526 and/or PA 528. In an aspect, RF front end 520 can use one or more switches to select a transmit or receive path using a specified filter 530, LNA 526, and/or PA 528, based on a configuration as specified by transceiver 514 and/or processor 536.

Antenna array 532 may include one or more antennas and be capable of concurrently transmitting or receiving multiple wireless transmissions.

A memory 534 may be configured to store data and/or local versions of applications described herein. Memory 534 can include any type of computer-readable medium usable by a computer or at least one processor 536, such as random access memory (RAM), read only memory (ROM), tapes, magnetic discs, optical discs, volatile memory 534, non-volatile memory 534, and any combination thereof. For example, memory 534 may be a non-transitory computer-readable storage medium that stores one or more computer-executable codes for performing the functions described herein when a processor 536 executes these functions.

In some examples, processor 536 may include modem 538. The one or more processors 536, modem 538, memory 534, transceiver 514, RF front end 520 and one or more antennas, may be configured to support voice and/or data calls (simultaneously or non-simultaneously) in one or more radio access technologies. In some cases, these components may communicate via one or more busses. In some cases, the functions described herein be executed by a single processor 536, while in other cases, different ones of the functions may be executed by a combination of two or more different processors 536. For example, in an aspect, the one or more processors 536 may include components for modulation, demodulation, baseband processing, digital signal processing, transmitter processing, receiver processing and may operate as part of or in conjunction with a transceiver 514.

In some examples, modem 538 may include access communications management component 540. Modem 538 can configure transceiver 514 to operate at a specified frequency and power level based on a communication configuration and protocol. In an aspect, modem 538 can be a multiband-multimode device which can process digital data and communicate with transceiver 514 such that the digital data is sent and received using transceiver 514. In an aspect, modem 538 can be multiband and be configured to support multiple frequency bands for a specific communications protocol. In an aspect, modem 538 can be multimode and be configured to support multiple operating networks 506 and communications protocols. In an aspect, modem 538 can control one or more components such as RF front end 520 or transceiver 514 to enable transmission and/or reception of signals based on a specified modem 538 configuration. In an aspect, the modem 538 configuration can be based on the mode of the modem 538 and the frequency band in use. In another aspect, the modem 538 can be configured be based on configuration information associated with a network 506 (e.g., information determined during cell selection and/or cell reselection).

Access communications management component 540 may establish communication with a UE 115 over a first component carrier using one or more beams and communicate with the UE 115 over the first component carrier using the candidate beam. In some examples, access communications management component 540 may include the following components: BS-SR component 542, beam selection component 544, and RACH component 546. In some cases, the first component carrier is a MMW carrier and the second component carrier is a sub-6 GHz carrier.

BS-SR component 542 may receive a BFRR from the UE 115 over a second component carrier in response to the UE 115 initiating beam recovery. In some cases, receiving the BFRR from the UE 115 over the second component carrier comprises: receiving a beam measurement report for the first component carrier along with the BFRR to the base station 105 on the second component carrier on resources allocated to the UE 115 for uplink transmission on the second component carrier. In some cases, receiving the BFRR from the UE 115 over the second component carrier comprises: receiving a logical signal from the UE 115 that indicates that the UE 115 has triggered beam recovery for the first component carrier. In some cases, receiving the BFRR from the UE 115 comprises: receiving at least one or more of a beam ID of the candidate beam in the BFRR. In some cases, the beam measurement report comprises at least one or more of a beam ID of the candidate beam or the beam ID of a current active beam.

Beam selection component 544 may identify a candidate beam on the first component carrier based on the BFRR received on the second component carrier; transmit a request from the base station 512 to the UE 115 for a beam measurement report for the first component carrier in response to receiving the BFRR from the UE 115; and transmit a beam switch command from the base station 105 to the UE 115, wherein the beam switch command instructs the UE 502 to switch active communication from the one or more beams to the candidate beam.

RACH component 546 may utilize a random access procedure on the second component carrier for beam recovery on the first component carrier.

FIG. 6 shows a schematic diagram 600 that supports performing a beam recovery procedure using a second CC in accordance with aspects of the present disclosure. Schematic diagram 600 may include the following components: base station 105, gateway 604, network 606, UL communications 608, DL communications 610, and UE 115.

Base station 105 may incorporate aspects of the base stations described with reference to FIGS. 1, 3, and 5.

Gateway 604, Network 606, UL communications 608, and DL communications 610 may incorporate aspects of the corresponding components of the same name described with reference to FIG. 5.

UE 115 may incorporate aspects of the UEs described with reference to FIGS. 1, 3, and 5. In some examples, UE 115 may include the following components: transceiver 614, RF front end 620, antenna array 632, memory 634, and processor 636.

Transceiver 614 may incorporate aspects of the transceiver described with reference to FIGS. 3 and 5. In some examples, transceiver 614 may include the following components: TX radio 616 and RX radio 618.

TX radio 616, RX radio 618, and RF front end 620 may incorporate aspects of the corresponding components of the same name described with reference to FIG. 5. In some examples, RF front end 620 may include the following components: input switch 622, radio switches 624, LNA 626, PA 628, and filter 630.

Input switch 622, Radio switches 624, LNA 626, PA 628, Filter 630, Antenna array 632, Memory 634, and Processor 636 may incorporate aspects of the corresponding components of the same name described with reference to FIG. 5. In some examples, processor 636 may include modem 638.

Modem 638 may incorporate aspects of the modem described with reference to FIG. 5. In some examples, modem 638 may include mobile communications management component 640. Mobile communications management component 640 may communicate with a base station 105 over a first component carrier using one or more beams. In some examples, mobile communications management component 640 may include the following components: beam recovery component 642, beam candidate component 644, UE BS-SR component, monitoring component 648, and beam measurement component 650. Beam recovery component 642 may determine to trigger beam recovery for the first component carrier.

Beam candidate component 644 may identify a candidate beam for communication with the base station 105 based on the determining.

UE BS-SR component 646 may transmit a BFRR from the UE 115 to the base station 105 over a second component carrier to signal beam recovery for the first component carrier; and transmit the beam measurement report for the first component carrier along with the BFRR to the base station 105 on the second component carrier on resources allocated for uplink transmission on the second component carrier.

In some cases, transmitting the BFRR from the UE 115 to the base station 602 over the second component carrier comprises: generating a beam measurement report regarding the first component carrier. In some cases, transmitting the BFRR from the UE 612 to the base station 602 over the second component carrier comprises: transmitting a logical signal from the UE 115 that indicates that the UE 115 has triggered beam recovery for the first component carrier. In some cases, transmitting the BFRR from the UE 115 to the base station 105 comprises: transmitting at least one or more of a beam ID of the candidate beam in the BFRR.

In some cases, the beam measurement report is generated by a MAC layer of the UE 612 and multiplexed with uplink data on PUSCH of the second component carrier. In some cases, the beam measurement report comprises at least one or more of a beam ID of the candidate beam or the beam ID of a current active beam. In some cases, the beam measurement report comprises a beam strength measurement for the candidate beam.

Monitoring component 648 may monitor the first component carrier on the one or more beams for a trigger to generate a beam measurement report in response to transmitting the logical signal from the UE 115 that indicates that the UE 115 has triggered beam recovery for the first component carrier; monitor PDCCH on the second component carrier for DCI related to the first component carrier in response to transmitting the BFRR to the base station 602; and monitor the second component carrier for beam switch command from the base station 105 in response to transmitting the BFRR to the base station 105, wherein the beam switch command requests the UE 115 to switch communication to the candidate beam.

Beam measurement component 650 may receive a request from the base station 105 for a beam measurement report for the first component carrier; generate the beam measurement report regarding the first component carrier in response to receiving the request; and transmit the beam measurement report regarding the first component carrier to the base station 105 over the second component carrier.

Figure 7:
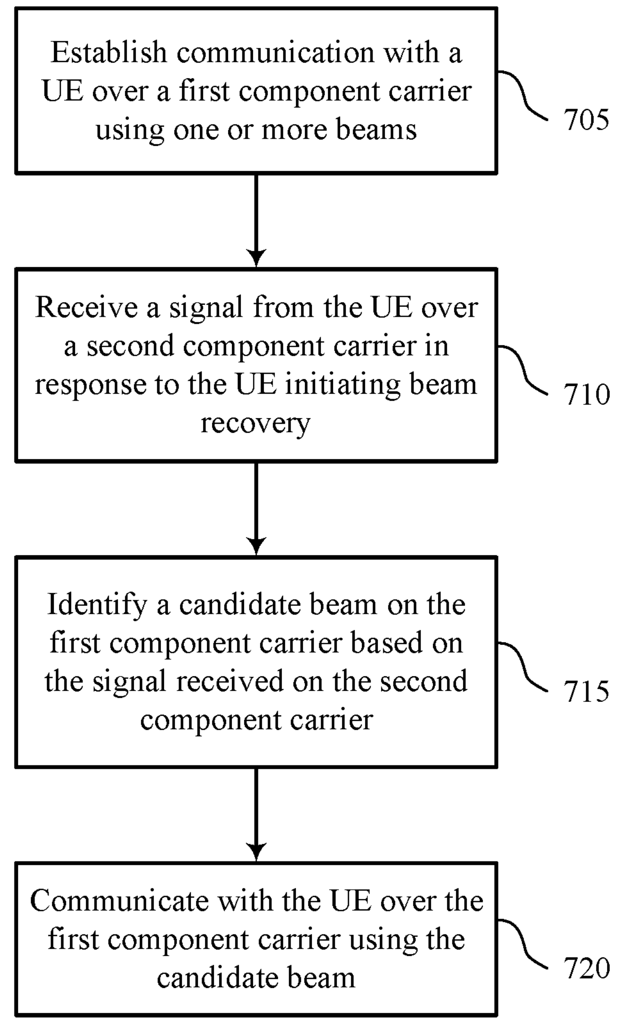
FIGS. 7 through 16 show various flowcharts that support performing a beam recovery procedure using a second CC in accordance with aspects of the present disclosure.

FIG. 7 shows a flowchart 700 that supports performing a beam recovery procedure using a second CC in accordance with aspects of the present disclosure. In some examples, the features of flowchart 700 may be performed by the base station 105. In some examples, a system or apparatus may execute a set of codes to control the functional elements of the device to perform the described functions. Additionally or alternatively, the system or apparatus may perform aspects of the functions described below using special-purpose hardware.

At block 705 the system or apparatus may establish communication with a UE over a first component carrier using one or more beams. The operations of this block may be performed according to the methods and processes described in the present disclosure. For example, the operations of this block may be composed of various substeps, or may be performed in conjunction with other operations described herein. In certain examples, aspects of the described operations may be performed by an access communications management component 540 as described with reference to FIG. 5.

At block 710 the system or apparatus may receive a signal from the UE over a second component carrier in response to the UE initiating beam recovery. The signal from the UE may be either a beam recovery scheduling request (BFRR) or a scheduling request (SR). Specifically, in some examples, instead of transmitting the complete BFRR signal, the UE BFRR signal may be similar to a regular SR signal and CDMed (Code Division Multiplexed), FDMed (Frequency Division Multiplexed) or TDMed (Time Division Multiplexed) with regular SR or with PRACH. (e.g., BFRR signal that may be based on a different sequence than that of the regular SR or the PRACH). In such example, BFRR may serve as a logical beam trigger signal (e.g., 1 bit) that signals to the base station that a beam recovery has been triggered by the UE. The operations of this block may be performed according to the methods and processes described in the present disclosure. For example, the operations of this block may be composed of various substeps, or may be performed in conjunction with other operations described herein. In certain examples, aspects of the described operations may be performed by a BS-SR component 542 in conjunction with transceiver 514 as described with reference to FIG. 5.

At block 715 the system or apparatus may identify a candidate beam on the first component carrier based on the BFRR received on the second component carrier. The operations of this block may be performed according to the methods and processes described in the present disclosure. For example, the operations of this block may be composed of various substeps, or may be performed in conjunction with other operations described herein. In certain examples, aspects of the described operations may be performed by a beam selection component 544 as described with reference to FIG. 5.

At block 720 the system or apparatus may communicate with the UE over the first component carrier using the candidate beam. The operations of this block may be performed according to the methods and processes described in the present disclosure. For example, the operations of this block may be composed of various substeps, or may be performed in conjunction with other operations described herein. In certain examples, aspects of the described operations may be performed by an access communications management component 540 as described with reference to FIG. 5.

Figure 8:
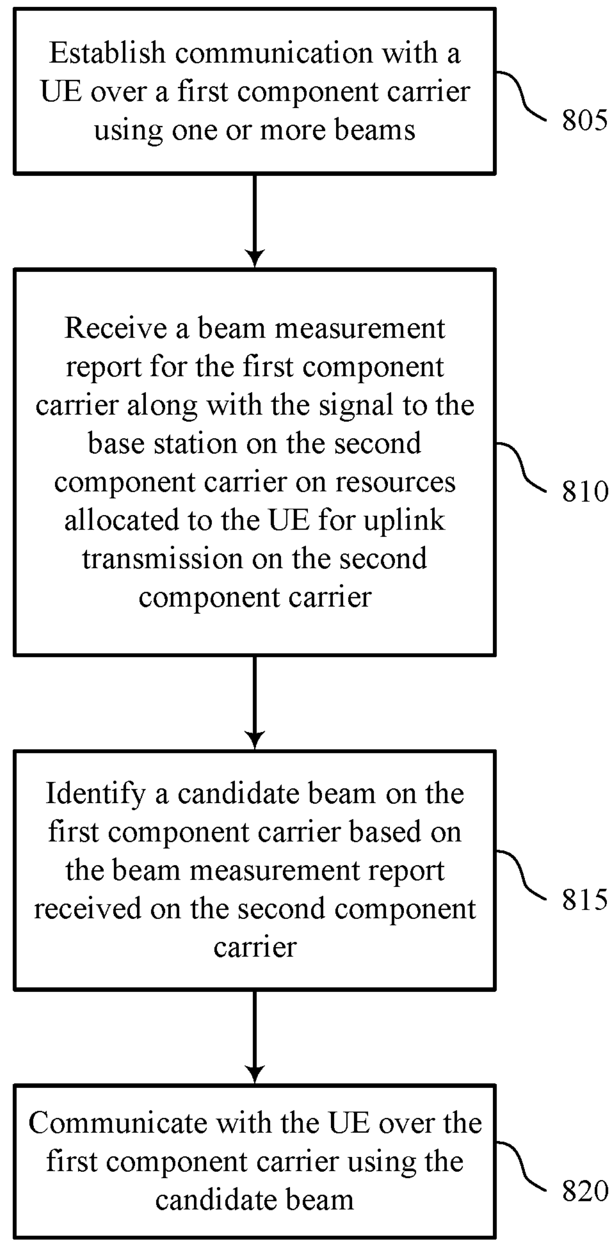

FIG. 8 shows a flowchart 800 that supports performing a beam recovery procedure using a second CC in accordance with aspects of the present disclosure. In some examples, the features of flowchart 700 may be performed by the base station 105. In some examples, a system or apparatus may execute a set of codes to control the functional elements of the device to perform the described functions. Additionally or alternatively, the system or apparatus may perform aspects of the functions described below using special-purpose hardware.

At block 805 the system or apparatus may establish communication with a UE over a first component carrier using one or more beams. The operations of this block may be performed according to the methods and processes described in the present disclosure. For example, the operations of this block may be composed of various substeps, or may be performed in conjunction with other operations described herein. In certain examples, aspects of the described operations may be performed by an access communications management component 540 as described with reference to FIG. 5.

At block 810 the system or apparatus may receive a beam measurement report for the first component carrier along with the BFRR to the base station on the second component carrier on resources allocated to the UE for uplink transmission on the second component carrier. The operations of this block may be performed according to the methods and processes described in the present disclosure. For example, the operations of this block may be composed of various substeps, or may be performed in conjunction with other operations described herein. In certain examples, aspects of the described operations may be performed by a BS-SR component 542 in conjunction with transceiver 514 as described with reference to FIG. 5.

At block 815 the system or apparatus may identify a candidate beam on the first component carrier based on the beam measurement report received on the second component carrier. The operations of this block may be performed according to the methods and processes described in the present disclosure. For example, the operations of this block may be composed of various substeps, or may be performed in conjunction with other operations described herein. In certain examples, aspects of the described operations may be performed by a beam selection component 544 as described with reference to FIG. 5.

At block 820 the system or apparatus may communicate with the UE over the first component carrier using the candidate beam. The operations of this block may be performed according to the methods and processes described in the present disclosure. For example, the operations of this block may be composed of various substeps, or may be performed in conjunction with other operations described herein. In certain examples, aspects of the described operations may be performed by an access communications management component 540 as described with reference to FIG. 5.

Figure 9:
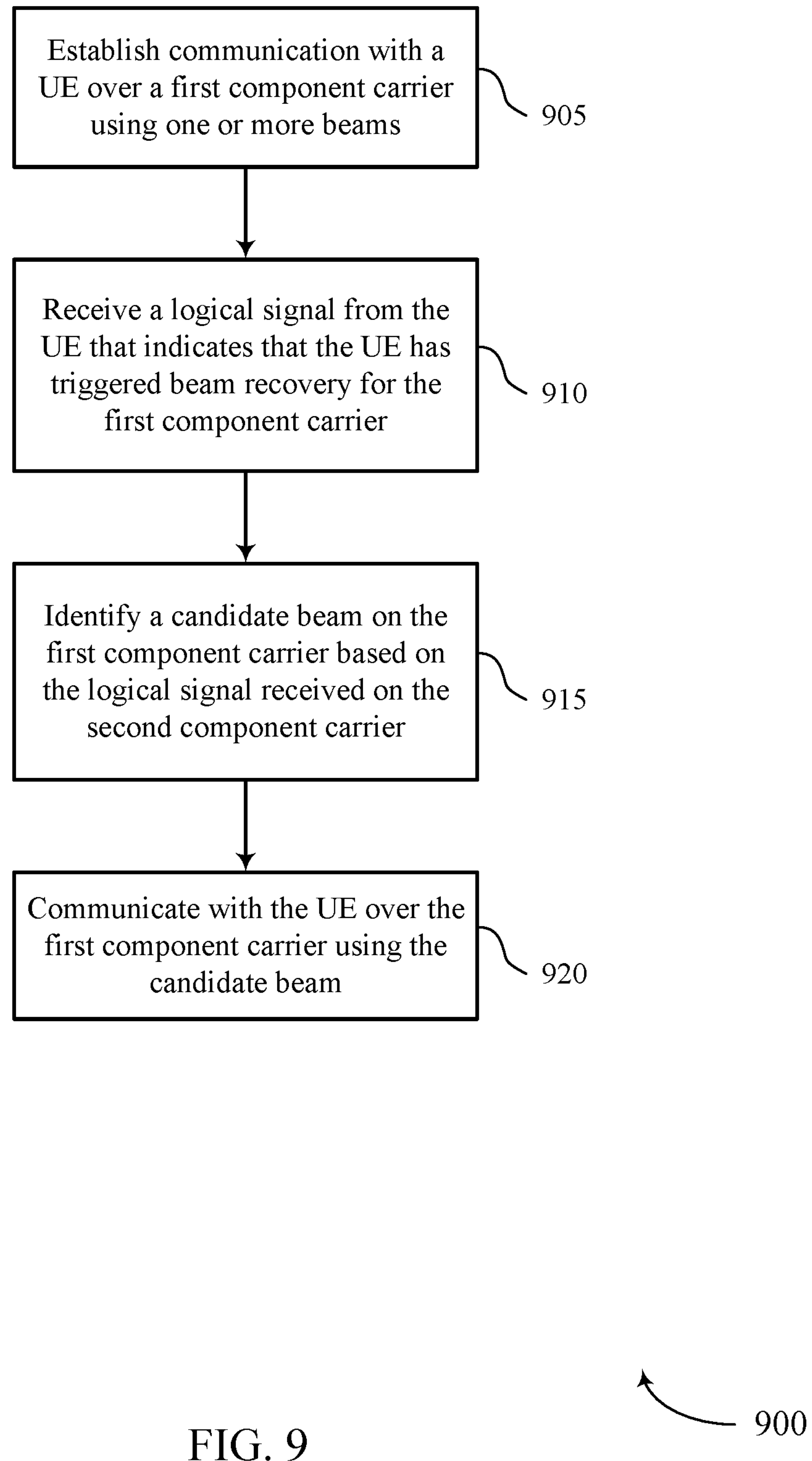

FIG. 9 shows a flowchart 900 that supports performing a beam recovery procedure using a second CC in accordance with aspects of the present disclosure. In some examples, a system or apparatus may execute a set of codes to control the functional elements of the device to perform the described functions. Additionally or alternatively, the system or apparatus may perform aspects of the functions described below using special-purpose hardware.

At block 905 the system or apparatus may establish communication with a UE over a first component carrier using one or more beams. The operations of this block may be performed according to the methods and processes described in the present disclosure. For example, the operations of this block may be composed of various substeps, or may be performed in conjunction with other operations described herein. In certain examples, aspects of the described operations may be performed by an access communications management component 540 as described with reference to FIG. 5.

At block 910 the system or apparatus may receive a logical signal from the UE that indicates that the UE has triggered beam recovery for the first component carrier. The operations of this block may be performed according to the methods and processes described in the present disclosure. For example, the operations of this block may be composed of various substeps, or may be performed in conjunction with other operations described herein. In certain examples, aspects of the described operations may be performed by a BS-SR component 542 as described with reference to FIG. 5.

At block 915 the system or apparatus may identify a candidate beam on the first component carrier based on the logical signal received on the second component carrier. The operations of this block may be performed according to the methods and processes described in the present disclosure. For example, the operations of this block may be composed of various substeps, or may be performed in conjunction with other operations described herein. In certain examples, aspects of the described operations may be performed by a beam selection component 544 as described with reference to FIG. 5.

At block 920 the system or apparatus may communicate with the UE over the first component carrier using the candidate beam. The operations of this block may be performed according to the methods and processes described in the present disclosure. For example, the operations of this block may be composed of various substeps, or may be performed in conjunction with other operations described herein. In certain examples, aspects of the described operations may be performed by an access communications management component 540 as described with reference to FIG. 5.

Figure 10:
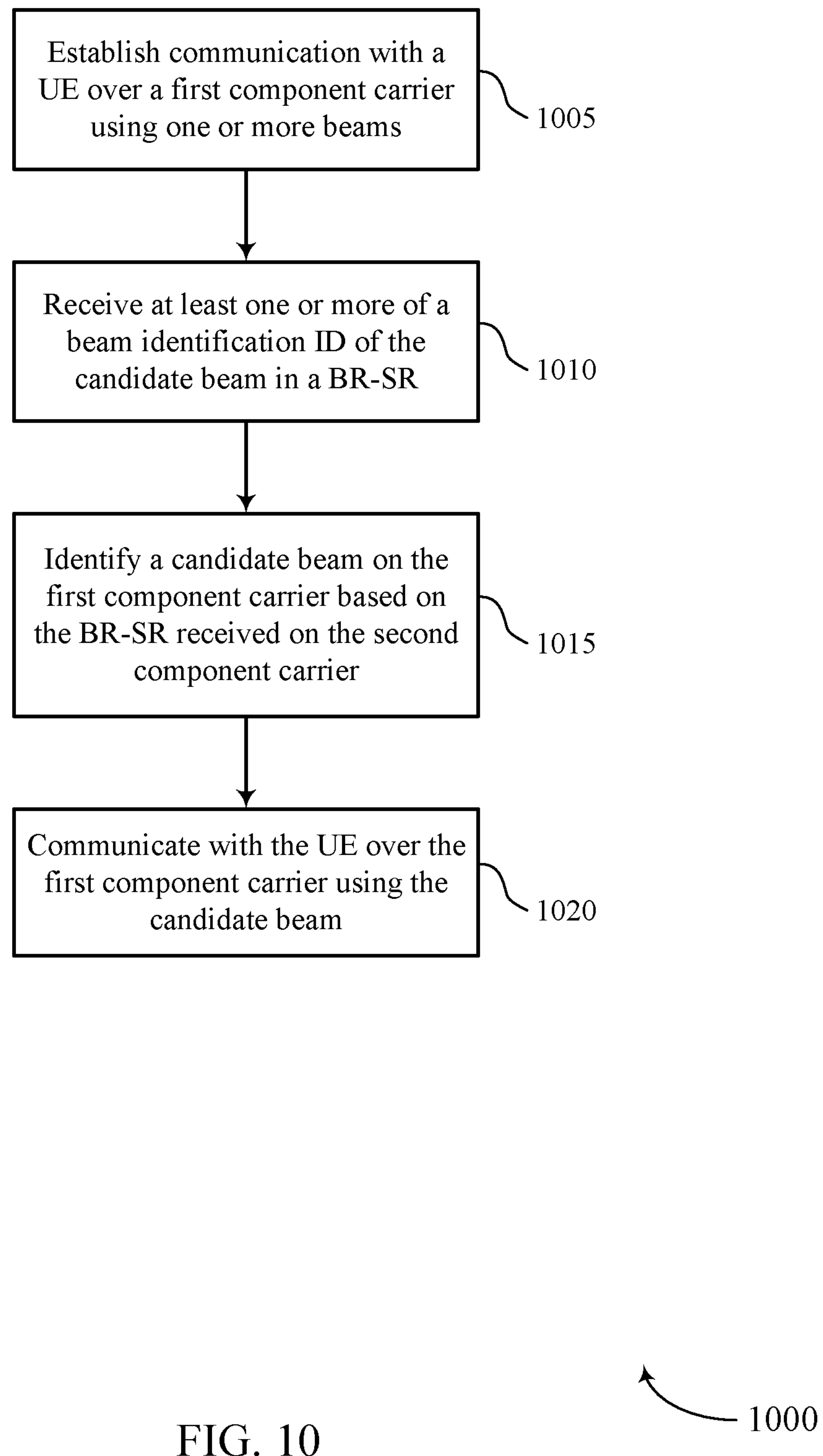

FIG. 10 shows a flowchart 1000 that supports performing a beam recovery procedure using a second CC in accordance with aspects of the present disclosure. In some examples, a system or apparatus may execute a set of codes to control the functional elements of the device to perform the described functions. Additionally or alternatively, the system or apparatus may perform aspects of the functions described below using special-purpose hardware.

At block 1005 the system or apparatus may establish communication with a UE over a first component carrier using one or more beams. The operations of this block may be performed according to the methods and processes described in the present disclosure. For example, the operations of this block may be composed of various substeps, or may be performed in conjunction with other operations described herein. In certain examples, aspects of the described operations may be performed by an access communications management component 540 as described with reference to FIG. 5.

At block 1010 the system or apparatus may receive at least one or more of a beam identification ID of the candidate beam in a BFRR. The operations of this block may be performed according to the methods and processes described in the present disclosure. For example, the operations of this block may be composed of various substeps, or may be performed in conjunction with other operations described herein. In certain examples, aspects of the described operations may be performed by a BS-SR component 542 as described with reference to FIG. 5.

At block 1015 the system or apparatus may identify a candidate beam on the first component carrier based on the BFRR received on the second component carrier. The operations of this block may be performed according to the methods and processes described in the present disclosure. For example, the operations of this block may be composed of various substeps, or may be performed in conjunction with other operations described herein. In certain examples, aspects of the described operations may be performed by a beam selection component 544 as described with reference to FIG. 5.

At block 1020 the system or apparatus may communicate with the UE over the first component carrier using the candidate beam. The operations of this block may be performed according to the methods and processes described in the present disclosure. For example, the operations of this block may be composed of various substeps, or may be performed in conjunction with other operations described herein. In certain examples, aspects of the described operations may be performed by an access communications management component 540 as described with reference to FIG. 5.

Figure 11:
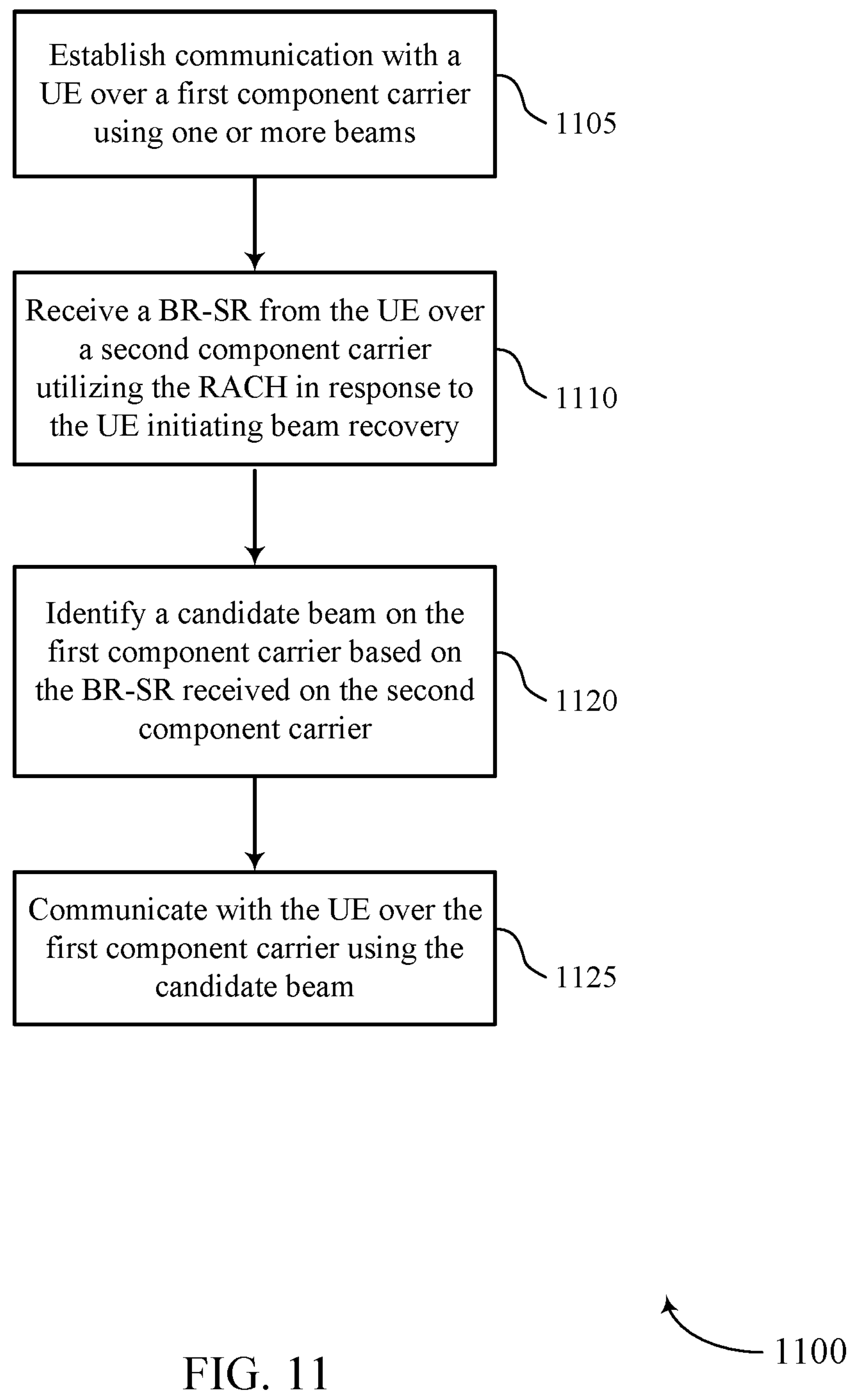

FIG. 11 shows a flowchart 1100 that supports performing a beam recovery procedure using a second CC in accordance with aspects of the present disclosure. In some examples, a system or apparatus may execute a set of codes to control the functional elements of the device to perform the described functions. Additionally or alternatively, the system or apparatus may perform aspects of the functions described below using special-purpose hardware.

At block 1105 the system or apparatus may establish communication with a UE over a first component carrier using one or more beams. The operations of this block may be performed according to the methods and processes described in the present disclosure. For example, the operations of this block may be composed of various substeps, or may be performed in conjunction with other operations described herein. In certain examples, aspects of the described operations may be performed by an access communications management component 540 as described with reference to FIG. 5.

At block 1110 the system or apparatus may receive a BFRR from the UE over a second component carrier in response to the UE initiating beam recovery by utilizing the random access procedure. The operations of this block may be performed according to the methods and processes described in the present disclosure. For example, the operations of this block may be composed of various substeps, or may be performed in conjunction with other operations described herein. In certain examples, aspects of the described operations may be performed by a BS-SR component and RACH component 546, as described with reference to FIG. 5.

At block 1120 the system or apparatus may identify a candidate beam on the first component carrier based on the BFRR received on the second component carrier. The operations of this block may be performed according to the methods and processes described in the present disclosure. For example, the operations of this block may be composed of various substeps, or may be performed in conjunction with other operations described herein. In certain examples, aspects of the described operations may be performed by a beam selection component 544 as described with reference to FIG. 5.

At block 1125 the system or apparatus may communicate with the UE over the first component carrier using the candidate beam. The operations of this block may be performed according to the methods and processes described in the present disclosure. For example, the operations of this block may be composed of various substeps, or may be performed in conjunction with other operations described herein. In certain examples, aspects of the described operations may be performed by an access communications management component 540 as described with reference to FIG. 5.

Figure 12:
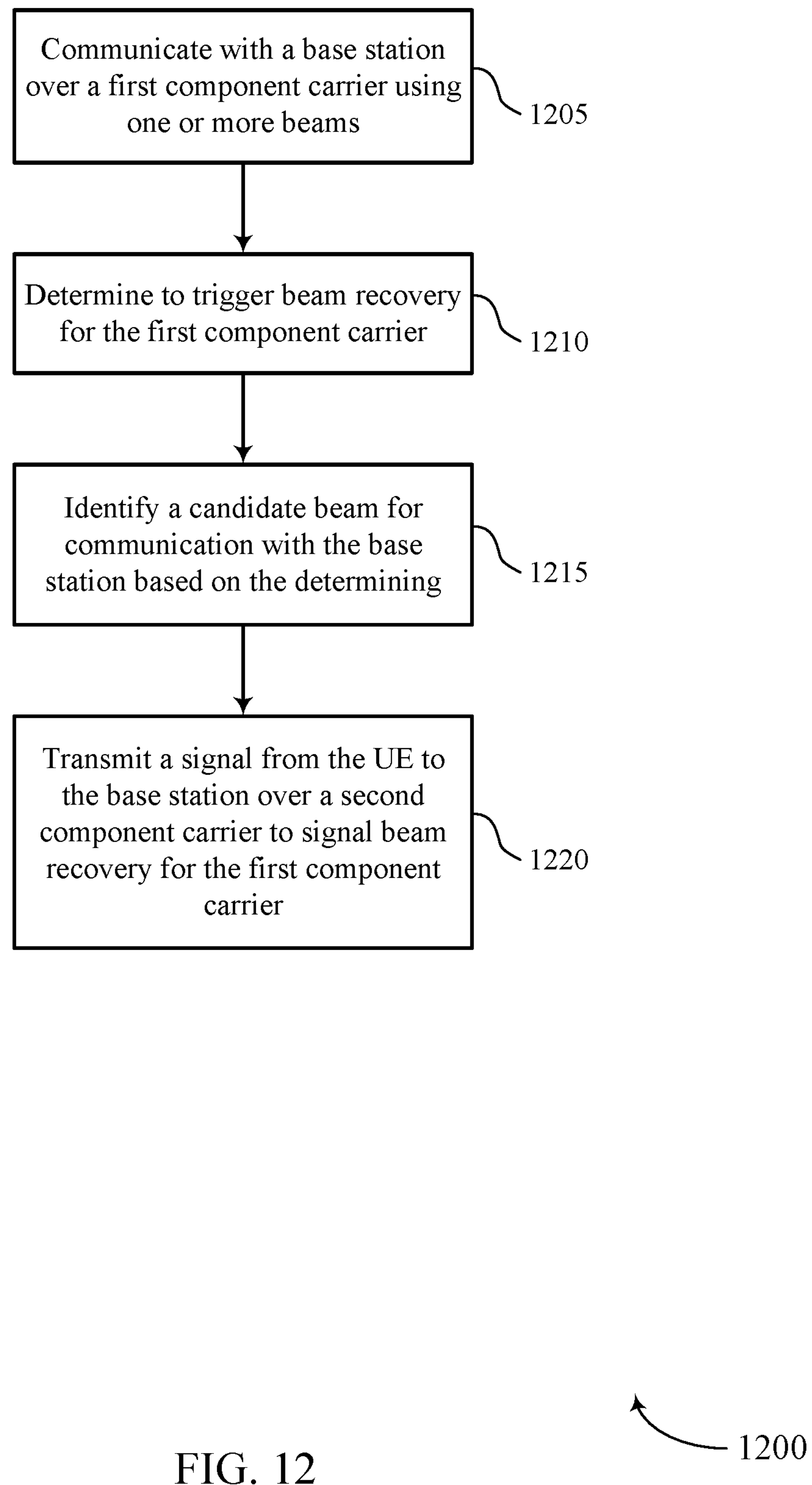

FIG. 12 shows a flowchart 1200 that supports performing a beam recovery procedure using a second CC in accordance with aspects of the present disclosure. In some examples, a system or apparatus may execute a set of codes to control the functional elements of the device to perform the described functions. Additionally or alternatively, the system or apparatus may perform aspects of the functions described below using special-purpose hardware.

At block 1205 the system or apparatus may communicate with a base station over a first component carrier using one or more beams. The operations of this block may be performed according to the methods and processes described in the present disclosure. For example, the operations of this block may be composed of various substeps, or may be performed in conjunction with other operations described herein. In certain examples, aspects of the described operations may be performed by a mobile communications management component 640 as described with reference to FIG. 6.

At block 1210 the system or apparatus may determine to trigger beam recovery for the first component carrier. The operations of this block may be performed according to the methods and processes described in the present disclosure. For example, the operations of this block may be composed of various substeps, or may be performed in conjunction with other operations described herein. In certain examples, aspects of the described operations may be performed by a beam recovery component 642 as described with reference to FIG. 6.

At block 1215 the system or apparatus may identify a candidate beam for communication with the base station based on the determining. The operations of this block may be performed according to the methods and processes described in the present disclosure. For example, the operations of this block may be composed of various substeps, or may be performed in conjunction with other operations described herein. In certain examples, aspects of the described operations may be performed by a beam candidate component 644 as described with reference to FIG. 6.

At block 1220 the system or apparatus may transmit a signal from the UE to the base station over a second component carrier to signal beam recovery for the first component carrier. The signal from the UE may be either a beam recovery scheduling request (BFRR) or a scheduling request (SR). The operations of this block may be performed according to the methods and processes described in the present disclosure. For example, the operations of this block may be composed of various substeps, or may be performed in conjunction with other operations described herein. In certain examples, aspects of the described operations may be performed by an UE BS-SR component 646 as described with reference to FIG. 6.

Figure 13:
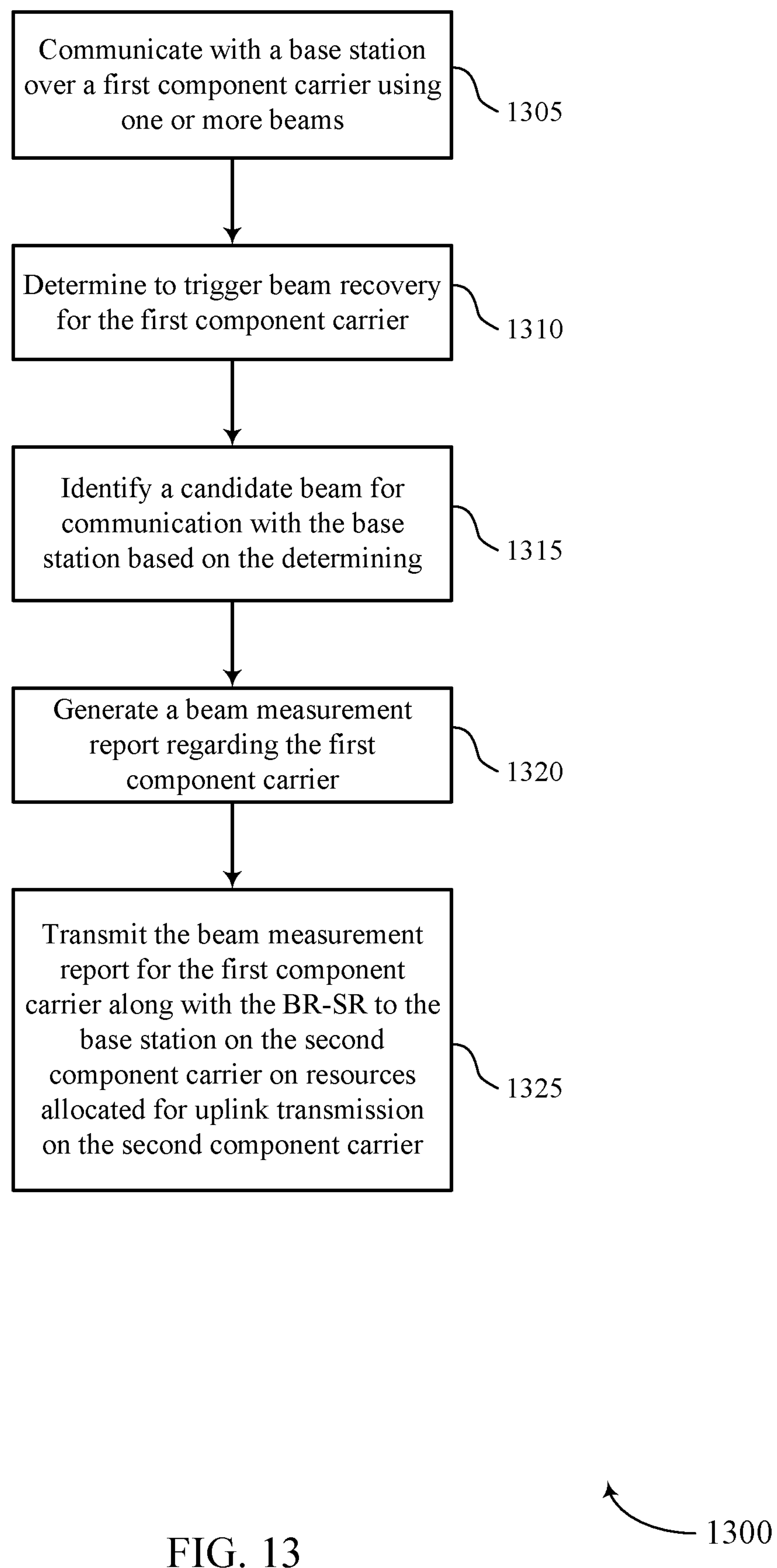

FIG. 13 shows a flowchart 1300 that supports performing a beam recovery procedure using a second CC in accordance with aspects of the present disclosure. In some examples, a system or apparatus may execute a set of codes to control the functional elements of the device to perform the described functions. Additionally or alternatively, the system or apparatus may perform aspects of the functions described below using special-purpose hardware.

At block 1305 the system or apparatus may communicate with a base station over a first component carrier using one or more beams. The operations of this block may be performed according to the methods and processes described in the present disclosure. For example, the operations of this block may be composed of various substeps, or may be performed in conjunction with other operations described herein. In certain examples, aspects of the described operations may be performed by a mobile communications management component 640 as described with reference to FIG. 6.

At block 1310 the system or apparatus may determine to trigger beam recovery for the first component carrier. The operations of this block may be performed according to the methods and processes described in the present disclosure. For example, the operations of this block may be composed of various substeps, or may be performed in conjunction with other operations described herein. In certain examples, aspects of the described operations may be performed by a beam recovery component 642 as described with reference to FIG. 6.

At block 1315 the system or apparatus may identify a candidate beam for communication with the base station based on the determining. The operations of this block may be performed according to the methods and processes described in the present disclosure. For example, the operations of this block may be composed of various substeps, or may be performed in conjunction with other operations described herein. In certain examples, aspects of the described operations may be performed by a beam candidate component 644 as described with reference to FIG. 6.

At block 1320 the system or apparatus may generate a beam measurement report regarding the first component carrier. The operations of this block may be performed according to the methods and processes described in the present disclosure. For example, the operations of this block may be composed of various substeps, or may be performed in conjunction with other operations described herein. In certain examples, aspects of the described operations may be performed by an UE BS-SR component 646 as described with reference to FIG. 6.

At block 1325 the system or apparatus may transmit the beam measurement report for the first component carrier along with the BFRR to the base station on the second component carrier on resources allocated for uplink transmission on the second component carrier. The operations of this block may be performed according to the methods and processes described in the present disclosure. For example, the operations of this block may be composed of various substeps, or may be performed in conjunction with other operations described herein. In certain examples, aspects of the described operations may be performed by an UE BS-SR component 646 as described with reference to FIG. 6.

Figure 14:
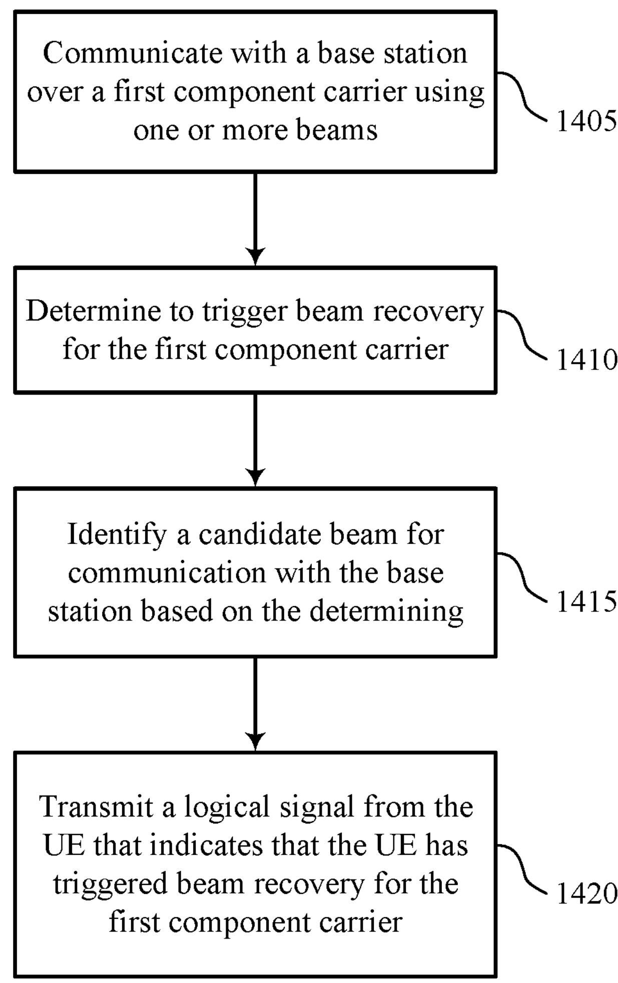

FIG. 14 shows a flowchart 1400 that supports performing a beam recovery procedure using a second CC in accordance with aspects of the present disclosure. In some examples, a system or apparatus may execute a set of codes to control the functional elements of the device to perform the described functions. Additionally or alternatively, the system or apparatus may perform aspects of the functions described below using special-purpose hardware.

At block 1405 the system or apparatus may communicate with a base station over a first component carrier using one or more beams. The operations of this block may be performed according to the methods and processes described in the present disclosure. For example, the operations of this block may be composed of various substeps, or may be performed in conjunction with other operations described herein. In certain examples, aspects of the described operations may be performed by a mobile communications management component 640 as described with reference to FIG. 6.

At block 1410 the system or apparatus may determine to trigger beam recovery for the first component carrier. The operations of this block may be performed according to the methods and processes described in the present disclosure. For example, the operations of this block may be composed of various substeps, or may be performed in conjunction with other operations described herein. In certain examples, aspects of the described operations may be performed by a beam recovery component 642 as described with reference to FIG. 6.

At block 1415 the system or apparatus may identify a candidate beam for communication with the base station based on the determining. The operations of this block may be performed according to the methods and processes described in the present disclosure. For example, the operations of this block may be composed of various substeps, or may be performed in conjunction with other operations described herein. In certain examples, aspects of the described operations may be performed by a beam candidate component 644 as described with reference to FIG. 6.

At block 1420 the system or apparatus may transmit a logical signal from the UE that indicates that the UE has triggered beam recovery for the first component carrier. The operations of this block may be performed according to the methods and processes described in the present disclosure. For example, the operations of this block may be composed of various substeps, or may be performed in conjunction with other operations described herein. In certain examples, aspects of the described operations may be performed by an UE BS-SR component 646 as described with reference to FIG. 6.

Figure 15:
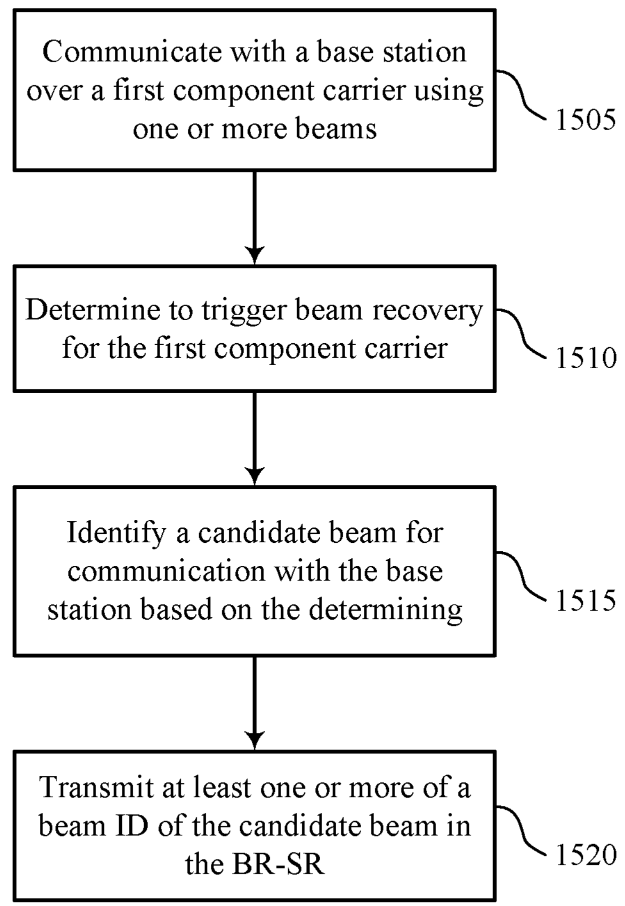

FIG. 15 shows a flowchart 1500 that supports performing a beam recovery procedure using a second CC in accordance with aspects of the present disclosure. In some examples, a system or apparatus may execute a set of codes to control the functional elements of the device to perform the described functions. Additionally or alternatively, the system or apparatus may perform aspects of the functions described below using special-purpose hardware.

At block 1505 the system or apparatus may communicate with a base station over a first component carrier using one or more beams. The operations of this block may be performed according to the methods and processes described in the present disclosure. For example, the operations of this block may be composed of various substeps, or may be performed in conjunction with other operations described herein. In certain examples, aspects of the described operations may be performed by a mobile communications management component 640 as described with reference to FIG. 6.

At block 1510 the system or apparatus may determine to trigger beam recovery for the first component carrier. The operations of this block may be performed according to the methods and processes described in the present disclosure. For example, the operations of this block may be composed of various substeps, or may be performed in conjunction with other operations described herein. In certain examples, aspects of the described operations may be performed by a beam recovery component 642 as described with reference to FIG. 6.

At block 1515 the system or apparatus may identify a candidate beam for communication with the base station based on the determining. The operations of this block may be performed according to the methods and processes described in the present disclosure. For example, the operations of this block may be composed of various substeps, or may be performed in conjunction with other operations described herein. In certain examples, aspects of the described operations may be performed by a beam candidate component 644 as described with reference to FIG. 6.

At block 1520 the system or apparatus may transmit at least one or more of a beam ID of the candidate beam in the BFRR. The operations of this block may be performed according to the methods and processes described in the present disclosure. For example, the operations of this block may be composed of various substeps, or may be performed in conjunction with other operations described herein. In certain examples, aspects of the described operations may be performed by an UE BS-SR component 646 as described with reference to FIG. 6.

Figure 16:
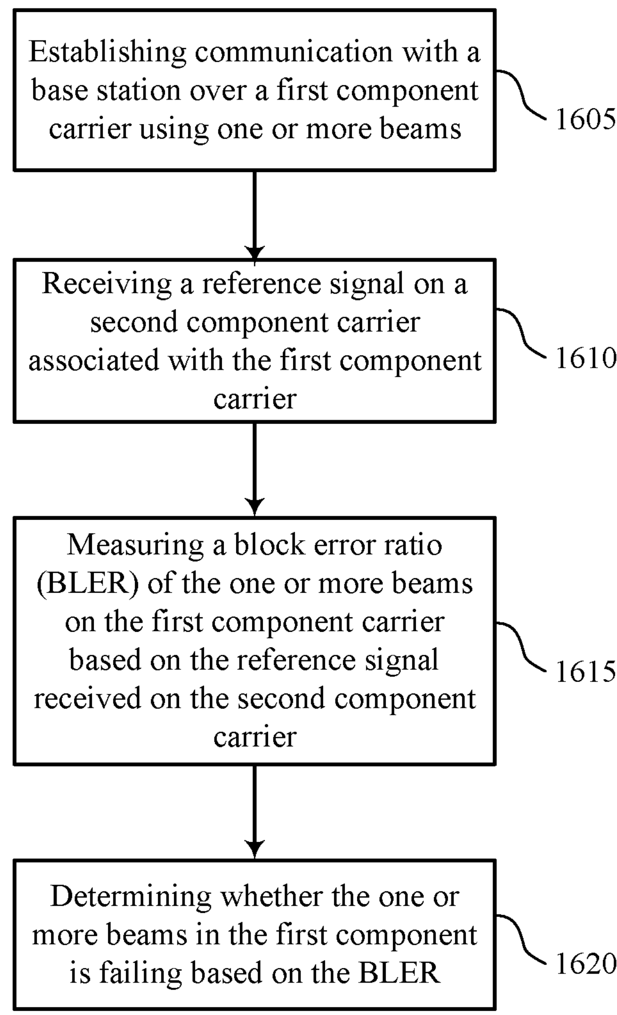

FIG. 16 shows a flowchart 1600 that supports performing a beam recovery procedure using a second CC in accordance with aspects of the present disclosure. In some examples, a system or apparatus may execute a set of codes to control the functional elements of the device to perform the described functions. Additionally or alternatively, the system or apparatus may perform aspects of the functions described below using special-purpose hardware.

At block 1605, the method may include establishing communication with a base station over a first component carrier using one or more beams. The operations of this block may be performed according to the methods and processes described in the present disclosure. For example, the operations of this block may be composed of various substeps, or may be performed in conjunction with other operations described herein. In certain examples, aspects of the described operations may be performed by an mobile communications management component 640 as described with reference to FIG. 6.

At block 1610, the method may include receiving a reference signal on a second component carrier associated with the first component carrier. The reference signal may be a SSB/CSI-RS in a second component carrier (e.g., a MMW carrier) as a reference (e.g., spatial QCL) for PDCCH DMRS such that the UE may detect beam failure in the first component carrier by estimating the PDCCH BLER. The operations of this block may be performed according to the methods and processes described in the present disclosure. For example, the operations of this block may be composed of various substeps, or may be performed in conjunction with other operations described herein. In certain examples, aspects of the described operations may be performed by monitoring component 648 as described with reference to FIG. 6.

At block 1615, the method may include measuring a BLER of the one or more beams on the first component carrier based on the reference signal received on the second component carrier. The operations of this block may be performed according to the methods and processes described in the present disclosure. For example, the operations of this block may be composed of various substeps, or may be performed in conjunction with other operations described herein. In certain examples, aspects of the described operations may be performed by beam measurement component 650 as described with reference to FIG. 6.

At block 1620, the method may include determining whether the one or more beams in the first component is failing based on the BLER. In some examples, the method may include determining whether the BLER satisfies (i.e., is above) an error threshold. If the BLER is less than the error threshold, the UE may signal that the beam associated with the reference signal is failing. The operations of this block may be performed according to the methods and processes described in the present disclosure. For example, the operations of this block may be composed of various substeps, or may be performed in conjunction with other operations described herein. In certain examples, aspects of the described operations may be performed by beam recovery component 642 as described with reference to FIG. 6.

The method may further optionally transmitting a BFRR on a second component carrier to signal beam recovery for the one or more beams on the first component carrier. The method may also include identifying a candidate beam on the first component carrier based on the reference signal received on the second component carrier. In some examples, the method of signaling the beam recovery may include transmitting a dedicated random access preamble in the second component carrier on resources associated with the one or more beams in the first component carrier.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications implemented by a user equipment (UE), comprising:

establishing communication with a base station over a first component carrier using one or more beams;

receiving a reference signal on a second component carrier associated with the first component carrier;

measuring a block error ratio (BLER) of a channel transmitted using the one or more beams on the first component carrier based on the reference signal received on the second component carrier;

determining whether the one or more beams in the first component carrier is failing based on the BLER; and identifying a candidate beam on the first component carrier based on the reference signal received on the second component carrier, wherein the first component carrier and the second component carrier are different carriers.

2. The method of claim 1, wherein determining whether the one or more beams in the first component carrier is failing based on the BLER, comprising:

determining whether the BLER satisfies an error threshold.

3. The method of claim 1, wherein the reference signal is one or more of a synchronization signal block (SSB) or a channel state information reference signal (CSI-RS) that is a reference for physical downlink control channel (PDCCH) demodulation reference signal (DMRS).

4. The method of claim 1, wherein identifying the candidate beam on the first component carrier comprises:

measuring a reference signal received power (RSRP) for the one or more beams in the first component carrier.

5. The method of claim 1, further comprises:

transmitting a beam failure recovery request (BFRR) on the second component carrier to signal beam recovery for the one or more beams on the first component carrier.

6. The method of claim 5, wherein transmitting the BFRR comprises:

transmitting a dedicated random access preamble in the second component carrier on resources associated with the one or more beams in the first component carrier.

7. The method of claim 1, wherein the reference signal is a shared reference signal.

8. The method of claim 1, wherein the reference signal is a same reference signal on the first component carrier and the second component carrier.

9. An apparatus for wireless communications, comprising:

a processor; and a memory storing instructions and in electronic communication with the processor, the processor being configured to execute the instructions to:

establish communication with a base station over a first component carrier using one or more beams;

receive a reference signal on a second component carrier associated with the first component carrier;

measure a block error ratio (BLER) of the one or more beams on the first component carrier based on the reference signal received on the second component carrier;

determine whether the one or more beams in the first component carrier is failing based on the BLER; and identify a candidate beam on the first component carrier based on the reference signal received on the second component carrier, wherein the first component carrier and the second component carrier are different carriers.

10. The apparatus of claim 9, wherein the instructions to determine whether the one or more beams in the first component carrier is failing based on the BLER, further comprise instructions to:

determine whether the BLER satisfies an error threshold.

11. The apparatus of claim 9, wherein the reference signal is one or more of a synchronization signal block (SSB) or a channel state information reference signal (CSI-RS) that is a reference for physical downlink control channel (PDCCH) demodulation reference signal (DMRS).

12. The apparatus of claim 9, wherein the instructions to identify the candidate beam on the first component carrier further include instructions to:

measure a reference signal received power (RSRP) for the one or more beams in the first component carrier.

13. The apparatus of claim 9, the processor being configured to execute the instructions to:

transmit a beam failure recovery request (BFRR) on the second component carrier to signal beam recovery for the one or more beams on the first component carrier.

14. The apparatus of claim 13, wherein the instructions to transmit the BFRR further comprise instructions to:

transmit a dedicated random access preamble in the second component carrier on resources associated with the one or more beams in the first component carrier.

15. A non-transitory computer readable medium storing instructions, executable by a processor, for wireless communications, comprising instructions for:

establishing communication with a base station over a first component carrier using one or more beams;

receiving a reference signal on a second component carrier associated with the first component carrier;

measuring a block error ratio (BLER) of the one or more beams on the first component carrier based on the reference signal received on the second component carrier;

determining whether the one or more beams in the first component carrier is failing based on the BLER; and identifying a candidate beam on the first component carrier based on the reference signal received on the second component carrier, wherein the first component carrier and the second component carrier are different carriers.

16. The non-transitory computer readable medium of claim 15, wherein the instructions for determining whether the one or more beams in the first component carrier is failing based on the BLER, further include instructions for:

determining whether the BLER satisfies an error threshold.

17. The non-transitory computer readable medium of claim 15, wherein the reference signal is one or more of a synchronization signal block (SSB) or a channel state information reference signal (CSI-RS) that is a reference for physical downlink control channel (PDCCH) demodulation reference signal (DMRS).

18. The non-transitory computer readable medium of claim 15, wherein the instructions for identifying the candidate beam on the first component carrier further comprise instructions for:

measuring a reference signal received power (RSRP) for the one or more beams in the first component carrier.

19. The non-transitory computer readable medium of claim 15, further comprises instructions for:

transmitting a beam failure recovery request (BFRR) on the second component carrier to signal beam recovery for the one or more beams on the first component carrier.

20. The non-transitory computer readable medium of claim 19, wherein the instructions to transmit the BFRR further comprise instructions to:

transmit a dedicated random access preamble in the second component carrier on resources associated with the one or more beams in the first component carrier.

* * * * *